US012415642B2

(12) United States Patent
Pollard, Jr. et al.

(10) Patent No.: US 12,415,642 B2
(45) **Date of Patent: *Sep. 16, 2025**

(54) DEVICES, SYSTEMS AND PROCESSES FOR FACILITATING OPENING OF BOXES

(71) Applicant: DISH Network L.L.C., Englewood, CO (US)

(72) Inventors: Jimmy A. Pollard, Jr., Boiling Springs, SC (US); Zachary Morrison, Greer, SC (US)

(73) Assignee: DISH Network L.L.C., Englewood, CO (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/397,267

(22) Filed: Dec. 27, 2023

(65) Prior Publication Data

US 2024/0124183 A1 Apr. 18, 2024

Related U.S. Application Data

(63) Continuation of application No. 17/035,966, filed on Sep. 29, 2020, now Pat. No. 11,897,652.

(51) Int. Cl.

*B65B 69/00* (2006.01)
*B26D 5/00* (2006.01)

(Continued)

(52) U.S. Cl.

CPC .......... *B65B 69/0041* (2013.01); *B26D 5/007* (2013.01); *B26F 1/10* (2013.01); *B26F 1/24* (2013.01)

(58) Field of Classification Search

CPC ..... B65B 43/48; B65B 69/00; B65B 69/0033; B65B 69/0041; B65B 61/18; B26F 1/10; B26F 1/24

See application file for complete search history.

(56) References Cited

U.S. PATENT DOCUMENTS

| | | | |
|---|---|---|---|
| 2,729,885 | A | 1/1956 | Wahl et al. |
| 3,135,049 | A | 6/1964 | Daugherty et al. |

(Continued)

FOREIGN PATENT DOCUMENTS

| | | | | | |
|---|---|---|---|---|---|
| DE | 102013114867 | A1 | 6/2015 | | |
| EP | 327319 | B1 | 5/1993 | | |
| EP | 0731029 | A1 * | 11/1996 | ............ | B65B 69/00 |

OTHER PUBLICATIONS

"ABOT For Automated Box Cutting", downloaded from the Internet at: www.robitca.us/abot-automated-box-cutting/, 2017, Publisher: Robotica Inc.

(Continued)

*Primary Examiner* — Joshua G Kotis

(74) *Attorney, Agent, or Firm* — Wash Park IP Ltd.; John T Kennedy

(57) ABSTRACT

An opening station for facilitating box opening may include a scanning station, an edge opening station, and a conveyor assembly. The scanning station is configured to measure a length "L", height "H", and/or width "W" of a substantially square box having a top, a bottom, two sides, and two edge portions. The edge opening station is configured to perform perforation operations on at least one of the two edge portions. A complete box opening system may include the scanning station, edge opening station, conveyor, and at least one of a top opening station and a side opening station.

20 Claims, 12 Drawing Sheets

(51) Int. Cl.
*B26F 1/10* (2006.01)
*B26F 1/24* (2006.01)

(56) References Cited

U.S. PATENT DOCUMENTS

| | | | | |
|---|---|---|---|---|
| 3,863,790 | A | 2/1975 | Kanarek | |
| 3,889,367 | A * | 6/1975 | Walker | B65B 69/0033 30/2 |
| 3,922,778 | A | 12/1975 | Aalpoel | |
| 4,583,352 | A | 4/1986 | Heron | |
| 5,101,703 | A | 4/1992 | Tanaka et al. | |
| 5,277,014 | A | 1/1994 | White | |
| 6,071,221 | A * | 6/2000 | Lozano | B26B 29/00 30/286 |
| 6,694,852 | B1 | 2/2004 | Ours et al. | |
| 6,863,486 | B2 | 3/2005 | Ours et al. | |
| 7,174,695 | B2 | 2/2007 | Porter et al. | |
| 7,720,567 | B2 | 5/2010 | Doke et al. | |
| 7,849,776 | B2 * | 12/2010 | Hilgendorf | B26D 11/00 414/412 |
| 11,897,652 | B2 * | 2/2024 | Pollard, Jr. | B26D 9/00 |
| 2005/0196266 | A1 | 9/2005 | Kropp | |
| 2007/0051585 | A1 * | 3/2007 | Scott | B65G 47/54 198/370.07 |
| 2007/0125209 | A1 * | 6/2007 | Hilgendorf | B26D 7/2621 83/72 |
| 2007/0162174 | A1 * | 7/2007 | Doke | B25J 9/0093 700/114 |
| 2008/0256907 | A1 | 10/2008 | Fraser | |
| 2013/0247524 | A1 * | 9/2013 | Ford | B65B 43/126 53/381.1 |
| 2018/0257241 | A1 * | 9/2018 | Claretti | B25J 15/0028 |
| 2019/0329990 | A1 * | 10/2019 | Leusink | B25J 15/026 |
| 2020/0122870 | A1 * | 4/2020 | Wapinsky | B65B 43/52 |
| 2020/0324929 | A1 * | 10/2020 | Peterlini | B65B 63/02 |
| 2021/0061506 | A1 * | 3/2021 | Pickett | B65B 59/003 |
| 2021/0086936 | A1 * | 3/2021 | Nishigaito | B65B 69/0033 |
| 2021/0245960 | A1 * | 8/2021 | Kiessner | B61B 1/00 |

OTHER PUBLICATIONS

"ALS Box Opening System webpage", downloaded from the Internet at: http://www.box-opening-system.com, 2020, Publisher: AutomaticLogistic Solutions.

"RAYBOT For Automated Box Cutting", downloaded from the Internet at: www.robitca.us/raybot-tape-seal-cutting-system, 2017, Publisher: Robotica Inc.

"TOM Box Opener", downloaded from the Internet at: http://www.box-opening-system.com/info/press-releases/, 2020, Publisher: Automatic Logistic Solutions.

* cited by examiner

DEVICES, SYSTEMS AND PROCESSES FOR FACILITATING OPENING OF BOXES

CROSS-REFERENCE TO RELATED APPLICATIONS

The present application claims priority to and is a CONTINUATION application of U.S. patent application Ser. No. 17/035,966, filed on 29 Sep. 2020, in the name of inventors Jimmy A. Pollard et al., and entitled "DEVICES, SYSTEMS AND PROCESSES FOR FACILITATING OPENING OF BOXES," the entire content of which are incorporated herein by reference.

TECHNICAL FIELD

The technology described herein generally relates to devices, systems, and processes for facilitating opening of boxes. More specifically, the technology described herein relates to devices, systems, and processes for facilitating the opening of cardboard boxes. Even more specifically, the technology described herein relates to devices, systems, and processes for facilitating the opening of boxes by automated perforation of a top, side, and edge of the box.

BACKGROUND

Various devices, systems and processes are used today to assist operators in opening boxes which may be manufactured, for example and not by limitation, in cardboard, wood, plastics, glass compounds, metals, or other materials and/or combinations thereof. Herein, such boxes are collectively referred to interchangeably as "cardboard boxes" and "boxes." Cardboard boxes typically need to be opened in significant quantities at product return facilities, product repair facilities, and the like. One prior art commercial use embodiment of such devices, systems and processes is described below in greater detail below and is identified with the label "prior art." Such commercial use facilitate partial opening by perforation of a top and sides of a box, but not the complete opening of a box. Such devices, systems, and processes have been demonstrated, based on actual commercial use thereof, to be ineffective in opening many cardboard boxes. When a given cardboard box remains unopened, after going through such a prior art automated opening process, typically the entire box opening line grinds to a halt while an operator removes the box from the line and manually opens the box. Such a disruption creates inefficiencies that the various embodiments of the present disclosure are provided to address by facilitating opening of a cardboard box along each of a box's top, along one or more sides, and along one or more edges. The various embodiments of the present disclosure address the above and other inadequacies of current devices, systems, and processes for opening cardboard boxes.

SUMMARY

The various embodiments of the present disclosure describe devices, systems, and processes for opening boxes.

For at least one embodiment, a system, for facilitating automated opening of a box may include a scanning station configured to measure one or more of a length, height, and width of a box. The box may have a length L, a height H, and a width W. The box may be formed in substantially one of a square or rectangular configuration by having a top portion, a bottom portion, wherein each of the top portion and the bottom portion having L by W dimensions, two side portions having L by H dimensions, and two edge portions having H by W dimensions. An edge opening station may be configured to perform perforation operations on at least one of the two edge portions. A conveyor assembly may be configured to contact the bottom portion of the box and facilitate movement of the box thru each of the scanning station and the edge opening station.

The system may include a top opening station configured to perforate the top portion of the box. The conveyor assembly may be configured to facilitate movement of the box thru the top opening station.

The system may include a side opening station configured to perforate the side portion of the box. The conveyor assembly may be configured to facilitate movement of the box thru the side opening station. The side opening station may be configured to perforate the side portion of the box.

The box may be a substantially square or rectangular container having one or more of the top portion, side portions and edge portions manufactured, at least in part, from at least one of cardboard, wood, plastic, metal, and glass.

For at least one embodiment, the edge opening station may include an edge leading plate, and an edge trailing plate. At least one of the edge leading plate and edge trailing plate may include an edge guide slot. The edge opening station may also include an edge perforating wheel and an edge perforating wheel holding block coupled to the edge perforating wheel and configured to facilitate movement of the edge perforating wheel within the edge guide slot. A first edge adjustment mechanism may be coupled to the edge leading plate and the edge trailing plate. A second edge adjustment mechanism may be coupled to the first edge adjustment mechanism. A third edge adjustment mechanism may be coupled to the edge perforating wheel block and the second edge adjustment mechanism.

The first edge adjustment mechanism may be an edge X axis adjustment mechanism, the second edge adjustment mechanism may be an edge Y axis adjustment mechanism, and the third edge adjustment mechanism may be an edge Z axis adjustment mechanism.

At least one the first edge adjustment mechanism, the second edge adjustment mechanism, and the third edge adjustment mechanism may be configured to adjust positions of at least one of the edge leading plate, the edge trailing plate, and the edge perforating wheel during an edge opening station operational phase.

The edge opening station operational phases may include at least one of an edge positioning phase, an edge perforating phase, an edge release phase, and an edge propel phase.

During an edge positioning phase, the first edge adjustment mechanism may be configured to adjust a distance Q between the edge leading plate and the edge trailing plate based on the length L and a longitudinal clearance margin C, and the second edge adjustment mechanism may be configured to adjust the edge leading plate to a height R, where R is the height H of the box plus a first vertical clearance margin D.

During an edge perforating phase, the first edge adjustment mechanism may be configured to adjust a distance Q between the edge leading plate and the edge trailing plate such that $Q<=L$, the second edge adjustment mechanism may be configured to a adjust the edge trailing plate to substantially the height R such that $R\sim H$, and the third edge adjustment mechanism may be configured to move the edge perforating wheel a distance S along the width W of the box.

The first edge adjustment mechanism may be configured to apply an edge pinching pressure on the box during an edge perforating phase. The second edge adjustment mechanism may be configured to apply an edge compression pressure on the box during an edge perforating phase. The third edge adjustment mechanism may be configured to apply an edge perforation pressure on the box during an edge perforating phase.

In accordance with at least one embodiment of the present disclosure, a device, for perforating an edge of a box may include a leading plate configured to first secure a box during a perforation operation. The box may have a length L, a height H, and a width W. The device may further include a trailing plate configured to second secure a box during the perforation operation. The trailing plate may include a guide slot. The device may further include a perforating wheel configured to perforate the box during the perforation operation. A first adjustment mechanism may be coupled to and configured to adjust a distance between the leading plate and the trailing plate. A second adjustment mechanism may be coupled to the leading plate and the trailing plate and configured to adjust a first height of the leading plate and a second height of the trailing plate. A third adjustment mechanism may be configured to move the perforating wheel along the guide slot provided in the trailing plate along a portion S of the width W of the box.

For at least one embodiment, the first height and the second height of the device may be independently adjusted by the second adjustment mechanism. The first adjustment mechanism may apply a pinching pressure on the box during a perforating phase. The second adjustment mechanism may apply an edge compression pressure on the box during an edge perforating phase. The third edge adjustment mechanism may apply an edge perforation pressure on the box during an edge perforating phase.

In accordance with at least one embodiment of the present disclosure, a method, for automatically opening a box may include an operation of determining, using a scanning system, dimensions of a box. The box may have a length L, a height H, and a width W. The box may have a top portion and a bottom portion, each being definable by L×W. The box may have a proximal side portion and a distal side portion, with each of the proximal side portion and the distal side portion being definable by H×L. The box may have a leading edge portion and a trailing edge portion, with each of the leading edge portion and the trailing edge portion being definable by H×W.

The operations may include determining whether the box dimensions are acceptable. When the box dimensions are not acceptable, the operations may include identifying the box for manual opening operations. When the box dimensions are acceptable, the operations may include perforating at least one of the leading edge portion and the trailing edge portion of the box.

The operations may also include perforation of at least one of the ledge edge portion and the trailing edge portion of the box by applying to the box each of an edge pinching pressure, an edge compression pressure, and an edge perforation pressure.

The operations may also include perforating at least one of the top portion of the box, the proximal side portion, and the distal side portion of the box.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments of the present disclosure describe devices, systems, and processes for facilitating opening of cardboard boxes.

Figure 1:
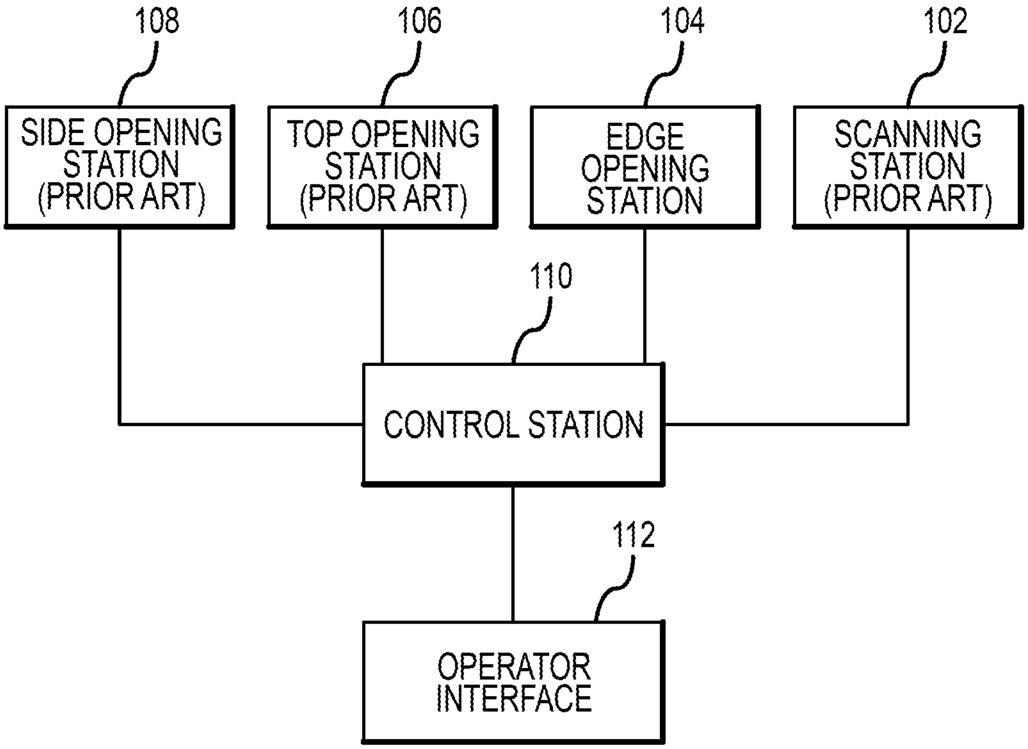
FIG. 1 is a block diagram illustration of a system for opening boxes and in accordance with at least one embodiment of the present disclosure.

As shown in FIG. 1 a system for opening cardboard boxes in accordance with an embodiment of the present disclosure may include use of various known, prior art box opening stations including a scanning station 102, a "top" opening station 106, and a "side" opening station 108. These prior art stations are discussed in greater detail below with reference to FIGS. 2 to 5.

In comparison, a system for opening cardboard boxes configured in accordance with the new automated system of the present disclosure also includes, as shown in FIGS. 6, 7A, 7B and 7C, a new "edge" opening station 104, and a control station 110 and operator interface 112 that are configured for use with the new system 600.

As used herein, a "top" of box is a reference to a portion of a box that has, on a X-Z plane of a X-Y-Z (length-height-width) "coordinate system," a substantially planar upper surface. A "side" of a box is a reference to each of two approximately vertical faces, as determined with reference to a horizontal conveyor assembly, that are substantially perpendicular to and connected to the "top" of the box and which each have a substantially planar surface on a X-Y plane of the coordinate system. An "edge" of a box is a reference to each of two substantially vertical faces that are substantially perpendicular to each of the top and the side(s) of the box and which each have a substantially planar surface on a Y-Z plane of the coordinate system. For purposes of discussion only, a box has a length "L", a height "H" and a width "W."

As further used herein and with reference to the Z axis of the coordinate system, "proximal" refers to a portion of a station that is closer to an operator's station, while "distal" refers to a portion of a station that is farther away from an operator's station. A distal location has a larger value on the Z axis of the coordinate system than a proximal location. Likewise, "higher" and "lower" are used herein with reference to the Y axis, and "leading" and "trailing" are used herein with reference to the X axis. While processing on a conveyor assembly, a box has a leading edge that first enters a given opening station and a trailing edge that last exits the given opening station.

It is to be appreciated that during shipping or at other times, a box may become deformed from a rectangular, square, or other configuration. Accordingly, one or more of the top, sides and/or edges may be deformed such that the planes formed for a given top, side or edge are not planar, parallel, perpendicular to another box portion, have indentations, have protrusions, or otherwise. For purposes of embodiments of the present disclosure, a box deformed by less than 1.5 inches and/or by less than 1.5 percent (35%), as measured by a relative difference in a length or height of a first side versus a second side, or a relative difference in a width or height of a first edge versus as second edge, is considered to be a box that is acceptable for use by an automated box opening system configured in accordance with an embodiment of the present disclosure. Boxes deformed greater than such above tolerances are typically considered to require semi-automated and/or manual opening operations.

Figure 2:
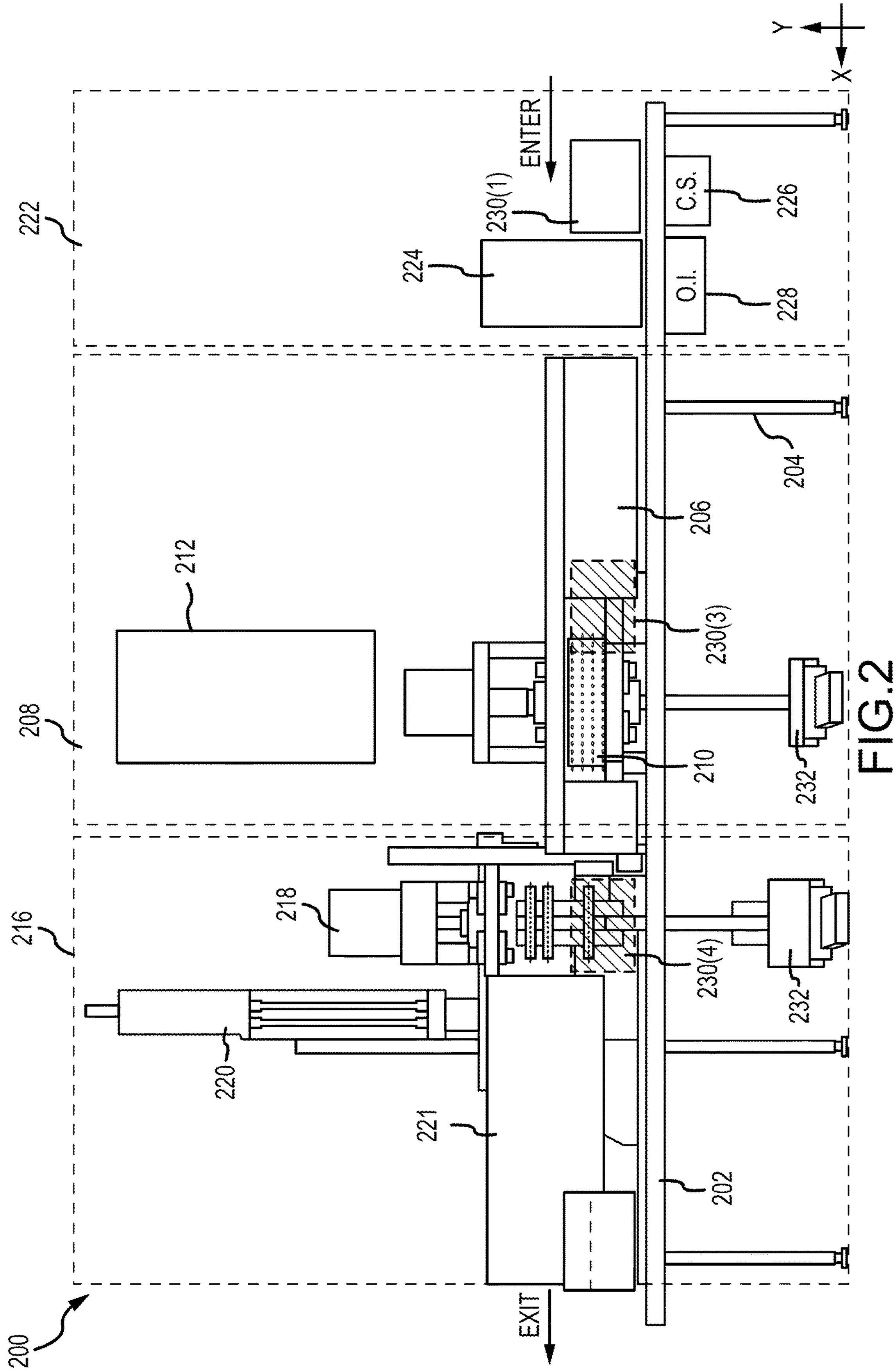
FIG.2 PRIOR ART
FIG. 2 is a schematic illustration of a prior art system for an automated box opening system.
Figure 6:
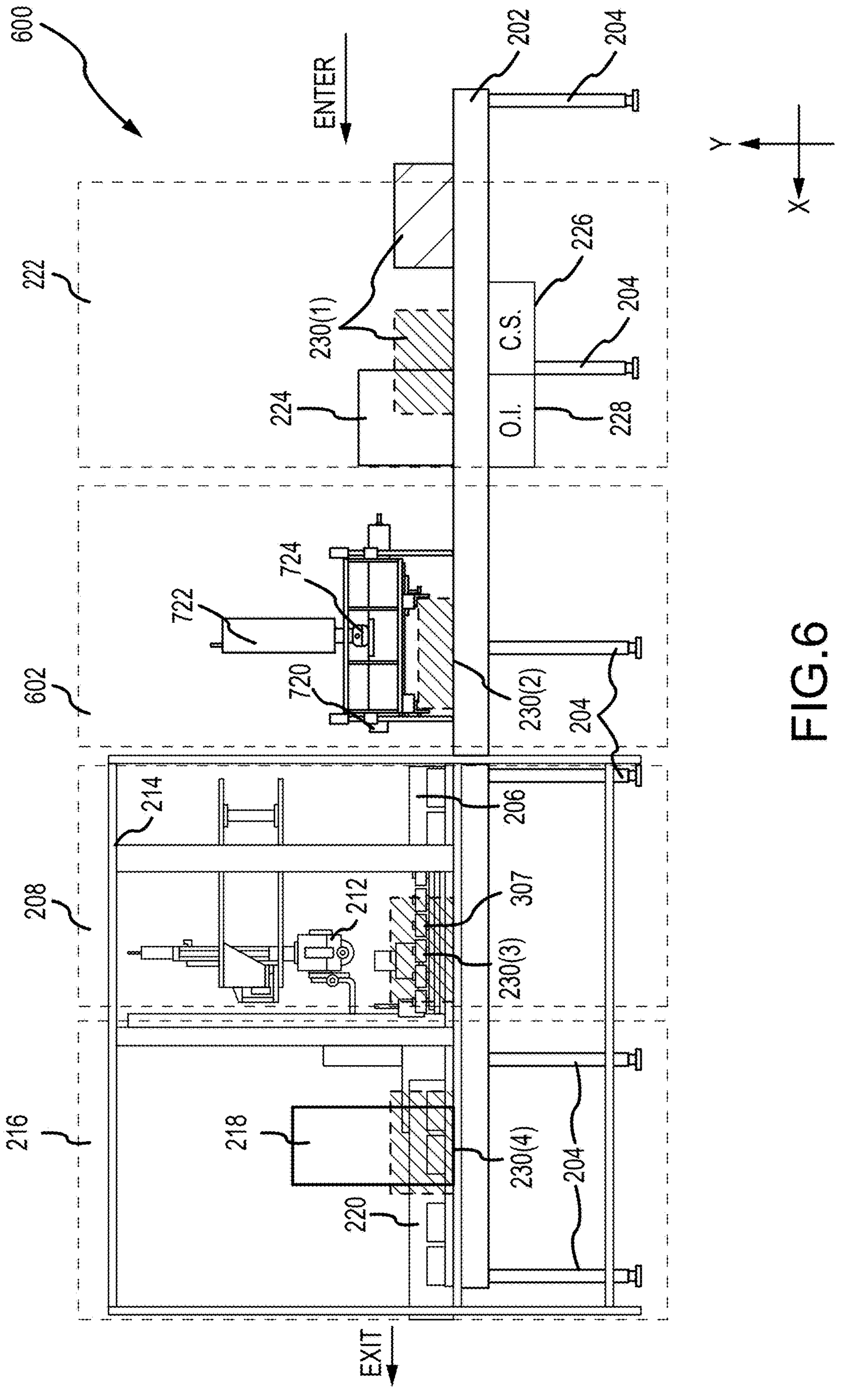
FIG. 6 is a schematic illustration of a new automated system for opening boxes configured in accordance with at least one embodiment of the present disclosure.

As shown in FIG. 2 for a prior art system 200 for opening cardboard boxes 230 and as further shown in FIG. 6 for a new system 600 for opening cardboard boxes 230, each system may include use of one or more conveyor assemblies 202. The conveyor assemblies 202 may be configured using any known or later arising device or system for conveying a cardboard box 230 between the various stations of the systems 200/600. Non-limiting examples of conveyor assemblies 202 include use of belts, rollers, flat top chains, roller chains, powered rollers, and the like. A single conveyor assembly for an entire system 200/600 or multiple conveyor assemblies, for use with portions thereof, may be used. For example, a separate conveyor assembly may be used for each of one or more given stations.

In FIGS. 2 and 6, the box 230 is shown at various station locations along the line, as designated by the labels 230(1), 230(2), 230(3), and 230(4). The actual position of a box 230 within a given station will vary over time as depending on the opening operation then being performed.

The prior art system 200 and the new system 600 may each include use of one or more pedestals 204. The pedestals 204 may be configured to position a given conveyor assembly 202 in a fixed or variable position relative to one or more of the box opening stations. For at least one embodiment of the present disclosure, as shown for example in FIG. 6, boxes 230 of varying heights may be accommodated by adjusting the relative height of opening station perforating element(s) and/or the relative height of the conveyor assembly 202 with respect thereto.

Top Opening Station 208

The prior art system 200 and the new system 600 may include a top opening station 208. The top opening station 208 may be configured to include a drive assembly 210, which is further shown and described with reference to FIG. 3, and a top perforating assembly 212, which is further shown and described with reference to FIG. 4.

Figure 3:
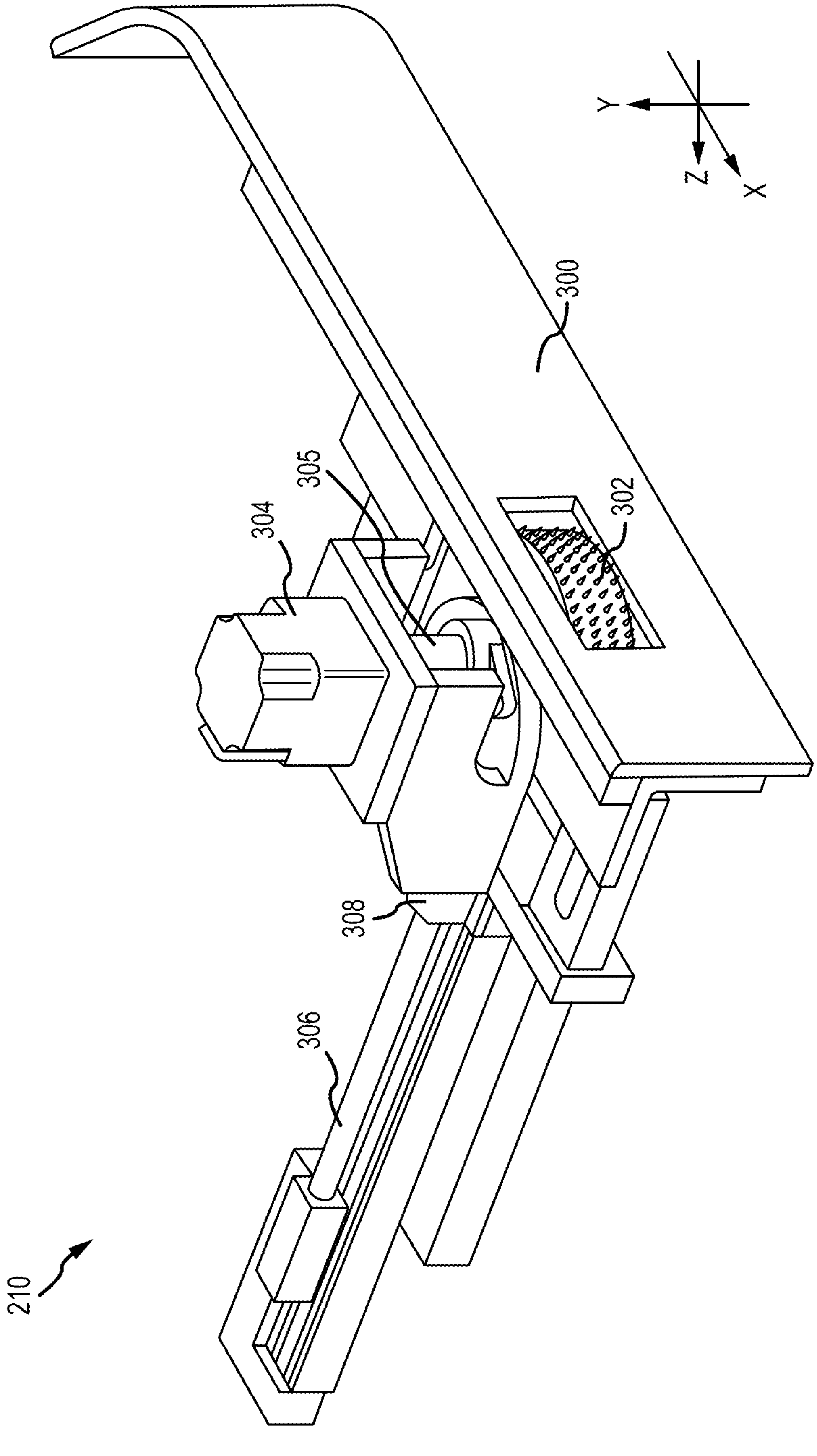
FIG.3 (PRIOR ART)
FIG. 3 is a schematic illustration of a drive assembly for the prior art box opening system of FIG. 2.

As shown in FIG. 3, the drive assembly 210 may be configured to propel a box 230 through one or more of the top opening station 208 and a side opening station 216. For at least one embodiment, a single drive assembly 210 may be used for both the top opening station 216 and the side opening station 216. For other embodiments, multiple drive assemblies 210 may be used. The drive assembly 210 may be configured to include a drive guide plate 300 configured to direct a box 230 into a given orientation relative to one or more opening stations members. For example and as shown in FIG. 3, the drive guide plate 300 may be configured with a rounded portion to facilitate a side-to-side movement of a box 230 on the conveyor assembly 202. For at least one embodiment, the drive guide plate 300 may be provided on a distal portion of the top opening station 208 for use in cooperation with one or more proximal drive guide elements 307 (as shown in FIG. 6). The one or more proximal drive guide elements 307 may include, for example and not by limitation, one or more fixed rollers.

The drive assembly 210 may be also configured to include a drive wheel 302. For at least one embodiment, the drive wheel 302 may include one or more pin, needles, prongs, teeth, friction pads or elements, laser or other energy or heat bearing beams, or the like (herein, "teeth") that are configured to perforate a portion of a side of a box 230 so as to "grab-hold" of the box 230 and facilitate controlled movement of the box 230 thru one or more opening stations of the system 200/600. Depending on the type of box material, the drive wheel teeth may vary one or more in sharpness, strength, material used, depth, numbers used, spacing on the drive wheel 302 and the like.

The drive assembly 210 may further include a drive motor 304 that is coupled to the drive wheel 304 by a drive shaft 305. The drive motor 304 may be configured to control the rotational speed of the drive wheel 302 and, thereby, the speed at which the box 230 processes thru one or more opening stations. The rotational speed of the drive shaft 305 and/or the drive wheel 302, as provided by the drive motor 304, may be fixed or variable. Further, various drive elements known in the art may be used with the drive assembly 210, with non-limiting examples including reduction gearing, clutches, torque controls, or the like. As further shown, the drive assembly 210 may include a drive Z axis adjustor 306 configured to change the location, along the Z axis, of the drive guide plate 300 and/or the drive wheel 302, relative to a drive proximal guide element 307 (as shown, e.g., in FIG. 6). The Z axis adjustor 306 may be set at a fixed distance and/or configured based upon control signals provided by a control station 226. The control station 226 may be configured to provide adjustment and/or other operating signals to the various stations based upon the dimensions H-L-W for a given box 230, as determined, for example, by a scanning station 222, as input by an operator, as fixed for all boxes, for otherwise.

The drive assembly 210 may further include a drive pressure sensor 308 configured to measure a current Z-axis pressure (or, as used herein, a "side" pressure) being applied upon a box 230 by the drive wheel teeth while the box 230(3) is passing thru the top opening station 208.

Referring again to FIGS. 2 and 6 and as mentioned above, each of the prior art system 200 and the new system 600 may also include a top opening station 208 that is configured with a top perforating assembly 212, suspended by a gantry 214 above the conveyor assembly 202.

Figure 4:
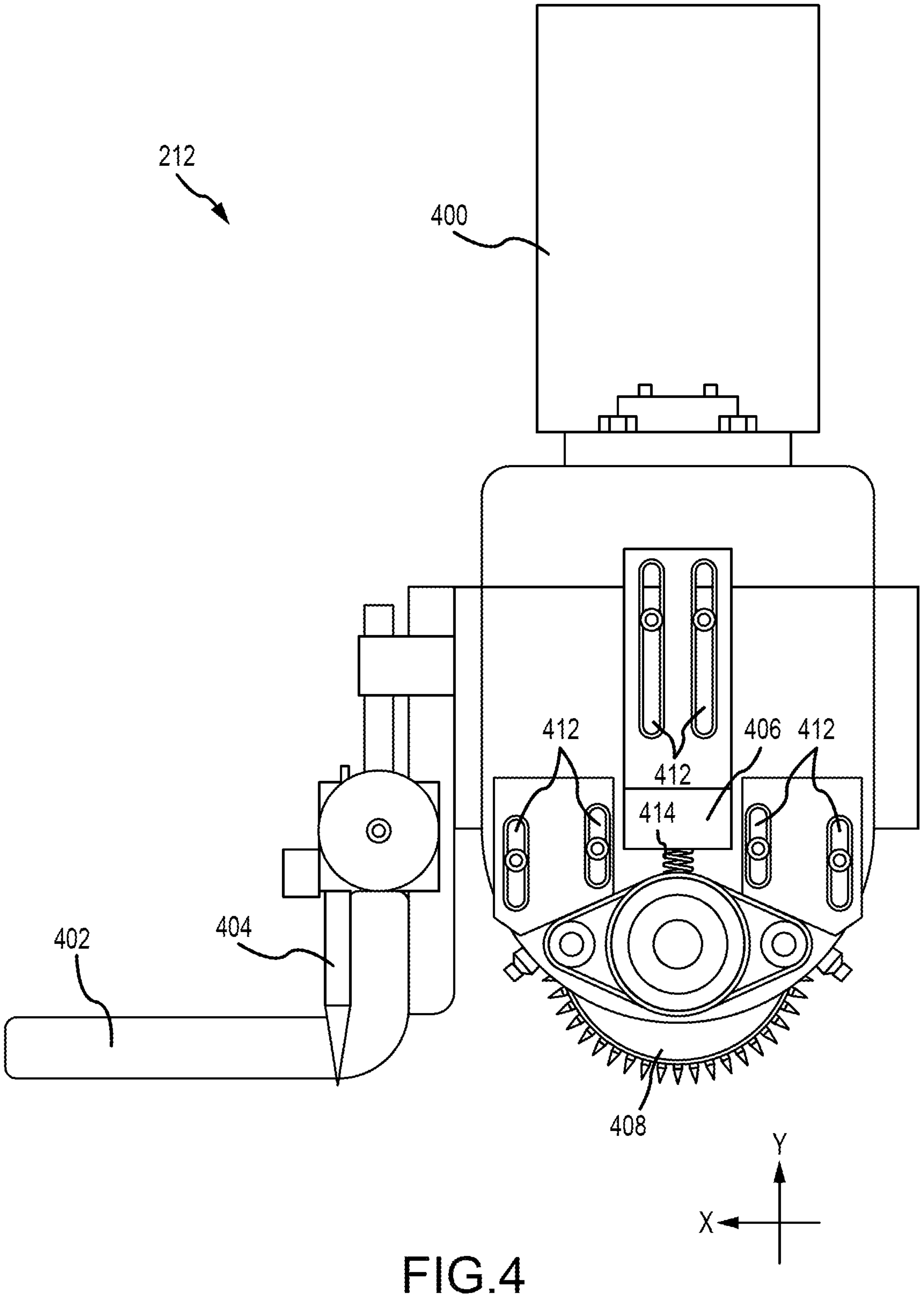
FIG.4 (PRIOR ART)
FIG. 4 is a schematic illustration of top opening station for the prior art box opening system of FIG. 2.

As further shown in FIG. 4, the top perforating assembly 212 may be configured to perforate a top portion of a box 230 along a substantial portion of, if not the entirety of, the length L of the box 230 and while the box 230(3) proceeds thru the top opening station 208. As discussed below with reference to FIG. 7A, L=Q, where "Q" is the X axis distance between an edge leading plate 708 and an edge trailing plate 710 when a box is secured for edge perforation in a new edge opening station 602.

The top perforating assembly 212 may be configured to include a height, or Y-axis adjustor 400. The Y axis adjustor 400 may be configured to adjust the height of the top perforating assembly 212 relative to a scanned, or otherwise determined height H of a top portion of the given box 230.

The top perforating assembly 212 may also be configured to include a top hold down member 402 configured to apply a pressure to a top of a given box 230, wherein the pressure is applied by the height adjustment of the top perforating assembly 212 by the Y axis adjustor 400. To facilitate the providing of a channel or the like in the top of a box 230, the top perforating assembly 212 may also be configured to include a torsion spring 404. The torsion spring 404 may facilitate a reduction in any crumpling of the top portion of the box 230 relative to a top perforating wheel 408. The top perforating wheel 408 may be configured as a round blade, a wheel having one or more needles, pins, teeth, or the like that are configured to facilitate perforation and/or cutting of the top portion of the box 230.

As further shown in FIG. 4, a top pressure sensor 406 may be used to measure a pressure applied by the top perforating wheel 408 upon the top of the box 230. The pressure applied may be fixed or varying. When varying, a pressure adjustor (not shown) may be used to increase or decrease the pressure applied by the top perforating wheel 408 upon a given box 230. It is to be appreciated that boxes may use varying thicknesses of cardboard, accordingly the amount of pressure needed to perforate a given box may vary with box type. Likewise, the amount of perforating/cutting depth of the top perforating wheel 408 with respect to a given box may vary. Accordingly, the top perforating assembly 212 may be configured to include one or more top adjustment slots 412 which facilitate adjustments to the perforating/cutting depth of the top perforating wheel 408. Adjustments of the top perforating wheel 408 relative to such top adjustment slots 412 may be performed manually or using one or more adjusting members (not shown) such as, but not limited to, adjustment pistons, gear drives, or the like.

The top perforating assembly 212 may also include use of a top pressure spring 414. The top pressure spring 414 may be configured to provide a variance in the prescribed pressure of the top perforating assembly 212, as provided by the height adjustments of the Y axis adjustor 400, such that the actual height of the top perforating wheel 408, at any given time, may vary based upon perturbances in the top surface of the box 230, and without requiring adjustments to the prescribed pressure.

The top perforating assembly 212 may be further configured to vary its vertical positioning based on readings from the top pressure sensor 406. Based upon sensed pressure readings the height "R" of the top perforating assembly 212 may be adjusted. It is to be appreciated that the height R of a box 230 may vary, such as when the box is crushed, indented, or otherwise deformed. Accordingly, R may vary and conform to deformities in the box 230 while the box processes along the conveyor assembly 202.

Side Opening Station 216

Figure 5:
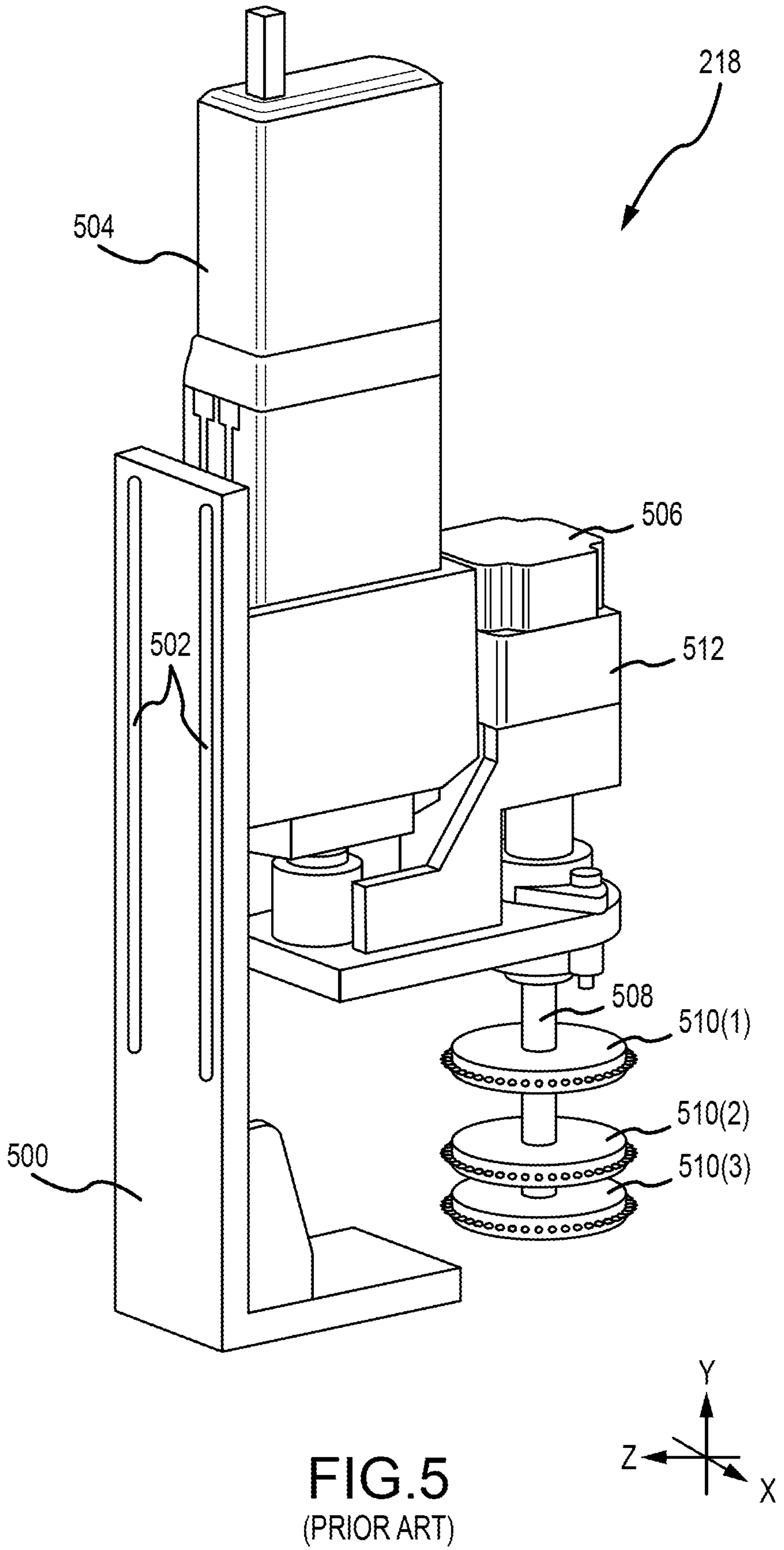
FIG.5 (PRIOR ART)
FIG. 5 is a schematic illustration of a side opening station for the prior art box opening system of FIG. 2.

Referring again to FIGS. 2 and 6, the prior art system 200 and the new system 600 may include use of a side opening station 216. The side opening station 216 may be configured to include one or more side perforating assemblies 218, one or more side adjustment assemblies 220, and a side guide plate 221. An embodiment of the side opening station 216 is shown in FIG. 5. When two or more side perforating assemblies 218 and/or side adjustment assemblies 220 are used, such assemblies may be positioned opposite to each other, so as to facilitate perforation of both sides of a given box 230, in sequence with each other, or otherwise.

As shown in FIG. 5, a side perforating assembly 218 may be configured to include a side adjustment stand 500 configured to adjust the operating height of a side drive stand 512 and one or more side perforating wheels 510 provided therewith. As shown, three side perforating wheels 510 may be used, such as first side perforating wheel 510(1), second side perforating wheel 510(2) and third side perforating wheel 510(3). Any number of side perforating wheel(s) 510 may be used. The side perforating wheel(s) 510 may be configured in any manner sufficient to perforate a given box 230(4) including, but not limited to, by use of one or more teeth. While three side perforating wheels 510 are shown, any number may be used. The spacing of any number of such side perforating wheels 510 may be fixed or variable. When variable, boxes of different opening configurations may influence spacing of such side perforating wheels 510. Adjustment mechanisms (not shown) may be included for automatically and/or manually adjusting the relative vertical placement of a given side perforating wheel 510 with respect to a given box 230 or type of boxes.

The side perforating wheel(s) 510 may also be fixed in relative height to each other and may be configured to perforate a box 230 at one or more fixed and/or adjustable heights along a side of a given box 230. To facilitate such height adjustments, a side opening station 216 may be configured to include one or more side height adjustment slots 502 and a side adjustment member 504 which is configured to raise or lower the side perforating wheel(s) 510 as directed by adjustment signals provided by the control station 226, by an operator, or otherwise. For at least one embodiment, the side opening station 216 may include a side motor 506 which is coupled to the side perforating wheel(s) 510 by a side drive shaft 508. The side motor 506 rotates the side perforating wheel(s) 510 which, when engaged with a given box 230, propel the box forward (leftward along the X axis in FIGS. 2 and 6) while the teeth perforating the box along one or more seams. For other embodiments, a side motor 506 may not be used and instead a side opening station drive assembly (not shown) may be used and/or the drive assembly 210 may be used to propel the box thru all or a desired portion of the side opening station 216. A side opening station drive assembly may also be configured to operate similarly as the drive assembly 210.

Figure 7A:
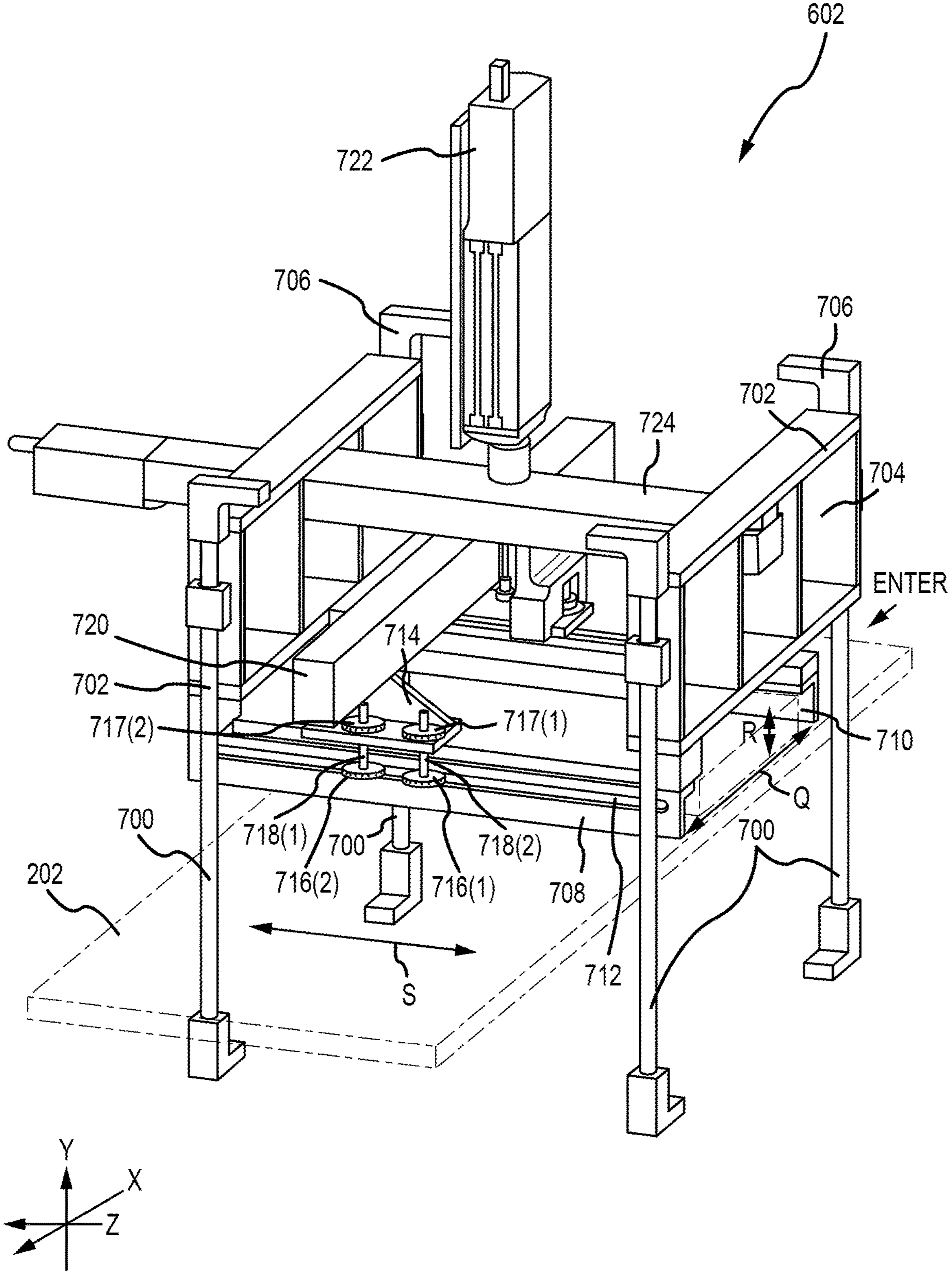
FIG. 7A is a schematic illustration providing a perspective view of an edge opening station configured for use in accordance with at least one embodiment of the present disclosure.
Figure 7B:
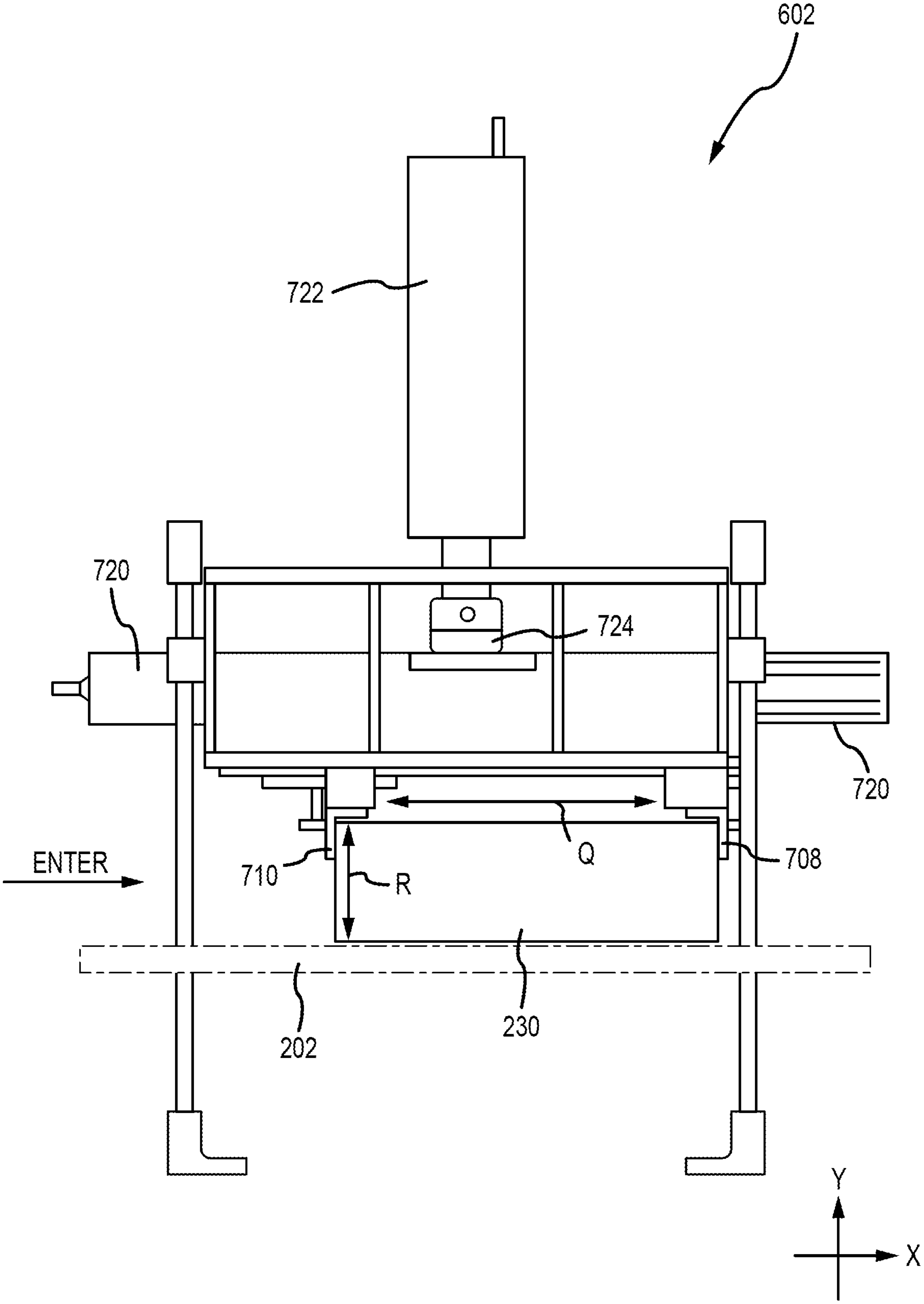
FIG. 7B is a schematic illustration providing a side view of the edge opening station of FIG. 7A and as configured for use in accordance with at least one embodiment of the present disclosure.
Figure 7C:
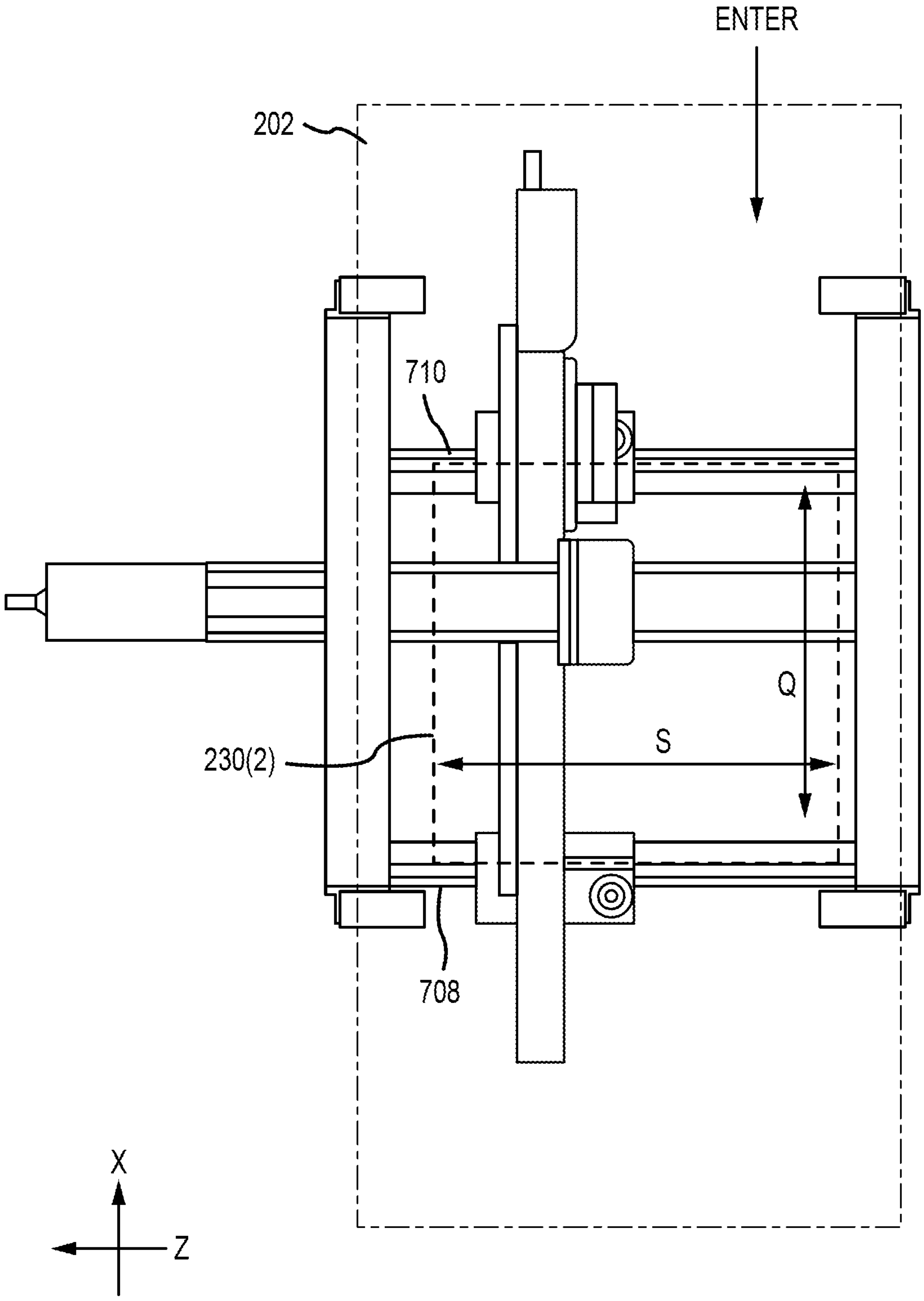
FIG. 7C is a schematic illustration providing a top view of the edge opening station of FIGS. 7A and 7B and as configured for use in accordance with at least one embodiment of the present disclosure.

The side perforating assembly 218 may be further configured to vary its Z axis positioning based on readings from a side pressure sensor (not shown). Based upon sensed pressure readings the amount of pressure applied on the box 230 by the side perforating assembly 218 may be adjusted. It is to be appreciated that the width "S" (as shown in FIGS. 7A/7B/7C) may vary, such as when the box is crushed, indented, or otherwise deformed. Accordingly, S may vary and conform to deformities in the box 230 while the box processes along the conveyor assembly 202.

As further shown in FIGS. 2 and 6, the side opening station 216 may be configured to include a side adjustment assembly 220. The side adjustment assembly 220 may be provided with or separate from the side perforating assembly 218. The side adjustment assembly 220 may be configured to provide adjustments to one or more of the height of the side perforating wheels 510 and the distal location of such side perforating wheels 510 along the Z axis by movement of the side perforating assembly 218 along the Z axis and in view of the scanned width W of the given box 230. It is to be appreciated that such movement, with respect to a given box, may be fixed or may vary with the length L of the box 230. Such movements may accommodate perforation of boxes having concave and/or convex side portions.

As further shown in FIG. 2 (and not shown in FIG. 6 for purposes of clarity only), the side opening station 216 may optionally include a side guide plate 221. The side guide plate 221 may include one or more members configured to provide an opposing force on a box 230 that is opposite to the side perforating assembly 218, when only one such side perforating assembly 218 is used.

Scanning Station 222

As shown in FIG. 2, the prior art system 200 and the new system 600 may each include a scanning station 222. The scanning station 222 may include a scanning assembly 224 configured to measure one or more of the length L, height H, and width W of a given box 230(1). Any known or later arising scanning technology may be used for the scanning assembly 224. Further, for the old system 200, only the height and width of a given box 230 are measured. For the new system 600, each of the length L, height H and width W of a given box 230 are measured. The scanning station 222 may be configured to reject boxes that exceed one or more pre-determined length, height, or width thresholds.

Control Station 226

As shown in FIG. 2, the prior art system 200 and the new system 600 may each include a control station 226. For both the prior art system 200 and the new system 600 the control station 226 may be configured to control operations of the top opening station 106 and the side opening station 108. For the new station 600, the control station 226 is further configured to control operations of the edge opening station 104 (FIG. 1)/602 (FIGS. 6 and 7A-7C).

The control station 226 may include a central processing unit (CPU) or similar electrical data processing device. Any known or later arising CPU may be used. The CPU may be provided by any local processing device capable of executing one more non-transient computer executable instructions (herein, each a "computer instruction") which, in accordance with an embodiment of the present disclosure, facilitate one or more operations including, but not limited to, control of one or more of edge opening station 104, the top opening station 106, and the side opening station 108.

The CPU may include one or more physical (as compared to logical) components configured for such data processing operations. For at least one embodiment, the CPU may include one or more hardware processors, such as 32-bit and 64-bit central processing units, multi-core ARM based processors, microprocessors, microcontrollers, and otherwise. The computer instructions may include instructions for executing one or more processes configured to perform computer executable operations. Such hardware and computer instructions may arise in any desired computing configuration including, but not limited to, local, remote, distributed, blade, virtual, or other configurations and/or systems configured for use in support of the one or more embodiments of the present disclosure. Any known or later arising technologies may be utilized in conjunction with an embodiment of the present disclosure to facilitate the CPU.

The CPU may be communicatively coupled, by a data bus or similar structure, to other components of the server including, but not limited to, a data storage module, which may also be referred to as a "computer readable storage medium." The data storage module may be a single storage device, multiple storage devices, or otherwise. The data storage module may be configured to store operating data, operating parameters, usage data, and other data. The storage device may be provided locally with the CPU or remotely, such as by a data storage service provided on the Cloud, and/or otherwise. Storage of data may be managed by a storage controller (not shown) or similar component. Any known or later arising storage technologies may be utilized in conjunction with an embodiment of the present disclosure to facilitate the data storage module.

Available storage provided by the data storage module may be partitioned or otherwise designated for permanent storage and temporary storage. Non-transient data, computer instructions, or other the like may be suitably stored in the data storage module. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store either, if not both, transient and non-transient computer instructions, and other data.

The control station 226 may be further configured, for at least one embodiment, to include a power module. The power module may include any known or later arising technologies which facilitate the use and control of electrical energy by the system 600. Non-limiting examples of such technologies include batteries, power converters, inductive charging components, line-power components, solar power components, switches, breakers, connectors, and otherwise.

Operator Interface 228

As shown in FIGS. 2 and 6, the prior art system 200 and the new system 600 may be configured to include one or more operator interfaces 228. As used herein, an operator interface 228 is defined as arising along the proximal edge of the conveyor assembly 202 but may arise elsewhere, such as in a central control station or at another location within a facility. Further, either side of the conveyor assembly 202, however, may be considered to be the proximal edge. Accordingly, references herein to proximal and distal are made for purposes of discussion only and are not to be considered to be limiting to any particular system orientation or configuration, operator placement, or otherwise. The operator interface 228 may use any known or later available technologies which facilitate one or more of operator control, monitoring, status, alarm, notifying, or otherwise of state, configuration, and/or condition of one or more of the scanning station 102, edge opening station 104 (for the new system 600), top opening station 106, and the side opening station 108.

As shown in FIG. 2 (and not shown for purposes of clarity only in FIG. 6), the operator interface 228 may also include an operator shut-off 232. The operator shut-off 232 may have any form, such as a foot operated shut-off 232 (as shown), one or more push buttons, voice activated, or otherwise. It is to be appreciated that an activation of a shut-off 232 with respect to any given station may also operate with respect to one or more, if not all, other stations in the systems 200/600. As shown in FIG. 2, multiple operator shut-offs 232 may be distributed throughout the systems 200/600. Operator shut-offs 232 may be specific to a given station, apply to all stations, or otherwise.

As shown in FIG. 6, the new system 600 includes an edge opening station 602. The edge opening station 602 is depicted as occurring before the top opening station 208 and after the scanning station 222. For other embodiments, the edge opening system 602 may be positioned after one of the top opening station 208 and/or the side opening station 216. As further shown in FIGS. 7A to 7C, the edge opening station 602 may be configured as a stand-alone station that is suspended by a pedestal having multiple legs 700. The use of a pedestal facilitates the locating of the edge opening station 602 along any portion of the conveyor assembly 202 for a box opening system. The edge opening station 602 may also be configured to include a stand-alone gantry having X axis gantry members 702, Y axis gantry members 704, and Z axis gantry members 706.

When the conveyor assembly 202 includes a perpetually moving belt or the like, the edge opening station 602 may also be configured to include a deployable stop plate (not shown) which, when deployed, is configured to inhibit forward movement of a given box along the conveyor when the box enters the edge opening station, as shown by box 230(2), and after edge perforation is complete, is retracted and allows the box to then further proceed along the conveyor assembly 202 to a next opening station or otherwise. For embodiments, where the box is not propelled by the conveyor assembly 202, such as by human interaction, or otherwise, a stop plate may not be needed.

The edge opening station 602 may also include an edge leading plate 708 and an edge trailing plate 710, both plates being configured to secure the box 230 when edge perforating is occurring by physical contact with the respective leading edge and trailing edge portions of the box. The edge leading plate 708 and the edge trailing plate 710 may be lowered upon entry of a given box into the edge opening station 602 and such plates may be raised after edge perforating operations have been completed, or as otherwise directed by the control system, by an operator, or otherwise. The raising and lowering of the edge leading plate 708 may occur separately and/or in conjunction with the raising and/or lowering of the edge trailing plate 710. For at least one embodiment, the edge leading plate 708 may be configured to operate as the above described stop plate.

For an embodiment, the edge trailing plate 710 may be configured to propel the box forward, along the conveyor assembly, after completion of edge perforation operations. One, if not both, of the edge leading plate 708 and the edge trailing plate 710 may be configured to have a fixed X axis position within the edge opening station 602, while the opposite thereof may be configured to a variable X axis position within the edge opening station 602. The variable position of an edge leading plate 708 and/or an edge trailing plate 710 facilitates adaption of an edge opening station 602 to boxes having varying lengths. For at least one embodiment, the edge opening station 602 may be configurable for use with boxes ranging from a minimum length L of 120 millimeters (120 mm) to a maximum length 800 millimeters (800 mm).

The edge opening station 602 may also be configured to perform edge perforation operations on boxes having widths W ranging from a minimum width of 100 millimeters (100 mm) to a maximum width of 530 millimeters (530 mm) Likewise, the edge opening station 602 may also be configured to perform edge perforation operations on boxes having heights H ranging from a minimum height of 75 millimeters (75 mm) to a maximum height of 350 millimeters (350 mm) For at least one embodiment, measurements of box dimensions may be determined and provided by the scanning station 222 to the edge opening station 602. For other embodiments, an edge opening station 602 may be configured for manual, operator adjustments, for use with boxes having varying dimensions, from box to box, along one or more axis. For an embodiment, an edge opening station 602 may be configured for use with boxes having fixed dimensions, or otherwise.

At least one, if not both, of the edge leading plate 708 and the edge trailing plate 710 may be configured to include one or more edge guide slots 712. The edge guide slots 712 may positioned at a fixed distance relative to the top of a box, or another definable location on a box, and configured to facilitate a controlled movement of an edge perforating wheel 716, having one or more teeth, along a width of a given box 230 at that fixed distance. The edge perforating wheel 716 may be configured such that perforation of a box at locations of a box other than along the respective edge guide slot 712 and at other than the fixed distance is prevented. For example, perforating of a box along an edge at a height that may overlap with a side of an article of commerce contained within the given box to be opened may be prevented by positioning of the edge guide slot 712 to coincide with packing members, such as Styrofoam inserts, used to retain a given article of commerce in a box. For at least one embodiment, the edge guide slots 712 are positioned within 0.5 millimeters (0.5 mm) of a top portion of a given box. Also can be adjusted as needed by mechanical or current force For at least one embodiment, the edge perforating wheel(s) 716 may be fastened to an edge perforating wheel holding block 714. Each edge perforating wheel holding block 714 may be configured for retaining one or more edge perforating wheels 716. The edge perforating wheels 716 may be configured in any manner sufficient to stabilize an edge perforating wheel 716 while it perforate a given box 230 and during other edge opening station operational phases. The edge perforating wheels 716 may be connected to an edge perforating wheel drive shaft 718 that is further connected to an edge perforating wheel collar 717. The collar 717 may be configured to permit vertical movements of the edge perforating wheel 716 within the edge guide slots 712 during edge perforation of a given box 230. Braking assemblies (not shown) may be provided for quickly stopping rotations of an edge perforating wheel 716, as when desired, for example, during an emergency shut-down or the like. For at least one embodiment, the edge perforating wheels 716 may not be separately motor driven. For other embodiments, one or more of the edge perforating wheels 716 may be motor driven and controlled. When motor driven, the rotational speed of one or more, if not all, of the edge perforating wheels 716 may be controlled, such control may arise in view of the types of box materials to be perforated, a pass depth, pass length, pass number, or otherwise. When not motor driven, the edge perforating wheels 716 may rotate based on a movement along the Z axis of the edge perforating wheel holding block 714.

For at least one embodiment, the edge perforating wheel block 714 is coupled to one or more of an edge X axis adjustment mechanism 720, an edge Y axis adjustment mechanism 722, and an edge Z axis adjustment mechanism 724. The adjustment mechanisms 720/722/724 may be configured to facilitate controlled movement of the edge perforating wheels 716 relative to a given box and during various edge opening station operational phases. Adjustment mechanisms 720/722/724 may be provided for use any, all or a specific edge perforating wheel 716, such as an adjustment mechanism configured for use in adjusting an edge perforating wheel 716 configured for use in perforating a leading edge of a box 230 versus one configured for use in perforating a trailing edge of a given box 203.

More specifically and for at least one embodiment, the edge X axis adjustment mechanism 720 may be configured for use in positioning the edge trailing plate 710 relative to a given box 230 the distance Q and as based upon a given edge opening station operational phase. For example, for an edge opening station operational phase may include an "edge positioning phase" occurring during a positioning of a given box 230 in the edge opening station 602. During such an edge positioning phase, the edge X axis adjustment mechanism 720 may be configured such that Q=L+C along the X axis from the edge leading plate 708 to the edge trailing plate 710, where "C" is a longitudinal clearance margin. C may be measured, predetermined, pre-set, or otherwise determined for any given box 230. For at least one embodiment, C is 2 millimeters (2 mm); other distances may be used for other embodiments.

For example, for another edge opening station operational phase may include an "edge perforating phase" during which edge perforation of the box is to occur, the edge X axis adjustment mechanism 720 may be configured to position the edge trailing plate 710 such that the given box 230 is secured between the edge leading plate 708 and the edge trailing plate 710 in a vice-like, pincher, or similar configuration. During this phase Q<=L (Q is less than or equal to L).

During the edge perforating phase, the edge X axis adjustment mechanism 720 may be configured to include one or more pressure monitors (not shown) that measure an "edge pinching pressure" applied upon the box 230 by the edge X axis adjustment mechanism through the cooperation of the edge leading plate 708 and the edge trailing plate 710. For at least one embodiment, an edge pinching pressure applied on a given box 230 by the edge X axis adjustment mechanism 720 and the edge leading and trailing plates ranges from one Pascal (1 Pa) to ninety-seven thousand Pascals (97,000 Pa). While the edge pinching pressure is being applied, Q<L. For at least one embodiment, the amount of difference between Q and L may be representative of and/or proportional to the pinching pressure applied on the box. The edge X axis adjustment mechanism 720 may use any known or later arising technologies that facilitate the position of the edge leading plate 708 and the edge trailing plate 710 at varying distances. Non-limiting examples, include belt drives, screw drives, hydraulic pistons, geared drives, and otherwise. For at least one embodiment, the edge X axis adjustment mechanism 720 may be coupled to the bottom of the edge Z axis adjustment mechanism 724.

For an "edge release phase," the X axis adjustment mechanism 720 may be configured such that any previously applied edge pinching pressure is released. Further, the edge X axis adjustment mechanism 720 may be configured again such that Q=L+C. The edge release phase commonly occurs after edge perforation of the box is completed, but may occur at other times such as during an emergency stop or otherwise.

For an "edge propel phase," the X axis adjustment mechanism 720 may move the edge trailing plate 710 with sufficient impulse, force, sustained action, or otherwise to propel the box 230 forward to the next opening station, or otherwise. The edge propel phase commonly occurs after the edge perforating phase and after the edge release phase. During the edge propel phase Q<L, with Q decreasing relative to L during the propel phase.

For an "edge stow phase," which commonly arises after either the edge release phase or the edge propel phase (when used), Q is reset and Q>+L+C.

The edge Y axis adjustment mechanism 722 may be configured to facilitate vertical movement of the edge leading and trailing plates 708/710, and the edge perforating wheel(s) 716 and with respect to various edge opening station operational phases.

For the edge positioning phase, a box 230 enter the edge perforating station 602 and the edge Y axis adjustment mechanism 722 may be configured to stow (by raising), if not already at a stowed position, at least the edge trailing plate 710, and any associated edge perforating wheel(s) 716 configured for use therewith. Further, the edge Y axis adjustment mechanism 722 may be configured to lower one or more of the edge leading plate 708 and the edge trailing plate 710 to a height, on the Y axis, of "R", where R=H+D, where "D" is a first vertical clearance margin. D may be measured, predetermined, pre-set, or otherwise determined for a given box 230.

For the edge perforating phase, the edge Y axis adjustment mechanism 722 may be configured to lower each, as applicable, of the edge leading plate 708 and the edge trailing plate 710 to a height, on the Y axis, of R~H. For at least one embodiment and during the edge perforating phase, the edge Y axis adjustment mechanism 722 may be configured to lower one or more, if not both of the edge leading plate 708 and the edge trailing plate 710 into a down position to support application of an edge pinching pressure by the edge X axis adjustment mechanism 720.

It is to be appreciated that the edge Y axis adjustment mechanism 722 may be configured to include one or more pressure monitors (not shown) that measure an "edge compression pressure" applied upon the box 230 during the edge perforating phase, or at any other desired time. The edge compression pressure is applied by the edge Y axis adjustment mechanism through the cooperation of the edge leading plate 708 and the edge trailing plate 710. For at least one embodiment, the edge compression pressure ranges from one Pascal (1 Pa) to ninety-seven thousand Pascals (97,000 Pa). The edge Y axis adjustment mechanism 722 may use any known or later arising technologies that facilitate the position of the edge leading plate 708 and the edge trailing plate 710 at varying distances above or coincident with a given box 230 and to apply or release an edge compression pressure. Non-limiting examples, include belt drives, screw drives, geared drives, and otherwise. For at least one embodiment, the edge Y axis adjustment mechanism 722 may be coupled to the top of the edge Z axis adjustment mechanism 724.

For the edge release phase, the edge Y axis adjustment mechanism 722 may be configured such that the edge compression pressure, if any, applied by one or more of the edge leading plate 708 and the edge trailing plate 710 is released. Further, the edge Y axis adjustment mechanism may be configured to raise at least the edge leading plate 708 to a "stowed" position such that contact between the edge leading plate 708 and the box 230 is terminated. Further, when an edge propel phase is not to be performed, the edge Y axis adjustment mechanism 722 may be configured to raise the edge trailing plate to a stowed position. When an edge propel phase is to be performed, the edge Y axis adjustment mechanism 722 may be configured to decrease the edge compression pressure, if any, applied by the edge trailing plate 710 on the box to a pressure level that does not inhibit and, for at least one embodiment, may facilitate propelling of the box forward during the edge propel phase.

During an edge propel phase and for at least one embodiment, the Y axis adjustment mechanism 722 may be configured such that R~H (R is substantially equal to H) for the edge trailing plate 710 and, for the edge leading plate 708, R=H+E, where "E" is a second vertical clearance margin. E may be measured, predetermined, pre-set, or otherwise determined vertical clearance margin and may be used whenever a box is to proceed thru an edge opening station without hindrance by one or more of the edge leading plate 708 and the edge trailing plate 710. For at least one embodiment, when raised to the E height, the respective edge leading plate 708 and/or edge trailing plate 710 is considered to be configured into a stowed position.

For at least one embodiment and during the edge propel phase, the edge Y axis adjustment mechanism 720 may be configured to apply a downward pressure and/or act as a height limit on one or both of the edge leading plate 708 and the edge trailing plate 710 such that during propulsion of the box 230 forward to the next opening station, rotation of the box 230 about the Z axis is inhibited, if not prevented. Thus, for at least one embodiment where independent raising and lowering of the edge leading plate 708 and the edge trailing plate 710 is facilitated, the edge Y axis adjustment mechanism 720 may include separate adjustment mechanisms for each of the edge leading plate 708 and the edge trailing 710 and such mechanisms configuration may vary with the edge opening station operational phases.

For another embodiment, a common edge Y axis adjustment mechanism 720 may be used where independent control is not provided for a given edge leading plate 708 vertical position versus a given edge trailing plate 710 vertical position. Instead and for such an embodiment, the vertical positioning of both the edge leading plate 708 and the edge trailing plate 710 may be provided by a single edge Y axis adjustment mechanism 720, with both plates being raised and lowered together.

During the edge perforating phase, the edge Z axis adjustment mechanism 724 may be configured to facilitate lateral movement, along the Z axis, of the edge perforating wheel(s) 716 so as to facilitate perforation of the box 230 by the edge perforating wheels 716 during the edge perforating phase. The edge Z axis adjustment mechanism 724 is commonly not used (other than to stow the edge perforating wheels 716 in a safe location, such as a distal end of an edge perforating wheel block 714), during other edge opening station operational phases.

The edge Z axis adjustment mechanism 724 may be configured to facilitate collective and/or independent movement of edge perforating wheels 716 with respect to a leading edge and a trailing edge of a box 230 along a Z axis distance "S". S may be equal to, less than, or greater than the box width W. For at least one embodiment, a first edge Z axis adjustment mechanism 724 may be used for leading edge perforating wheels 716 configured for use in perforating a leading edge of a box 230, with a second Z axis adjustment mechanism 724 being used for trailing edge perforating wheels 716 configured for use in perforating a trailing edge of a box 230. It is to be appreciated that independent Z axis adjustment mechanisms 724 may be needed when separate and/or independently adjustable Y axis adjustment mechanisms 722 are used with respect to the edge leading plate 708 and the edge trailing plate 710.

The edge Z axis adjustment mechanism 724 may be configured to include one or more pressure monitors (not shown) that measure an "edge perforation pressure" applied by the edge perforating wheel(s) 716 upon the box 230 during the edge perforation phase. For at least one embodiment, the edge perforation pressure ranges from one Pascal (1 Pa) to ninety-seven thousand Pascals (97,000 Pa). The edge perforation pressure may be fixed or variable. The edge Z axis adjustment mechanism 724 may use any known or later arising technologies that facilitate the positioning of a given edge perforating wheel 716 relative to a given box 230. Non-limiting examples, include belt drives, screw drives, geared drives, and otherwise. For at least one embodiment, the edge Z axis adjustment mechanism 724 may be used to couple the edge X axis adjustment mechanism 720 with the edge Y axis adjustment mechanism 724.

Figure 8A:
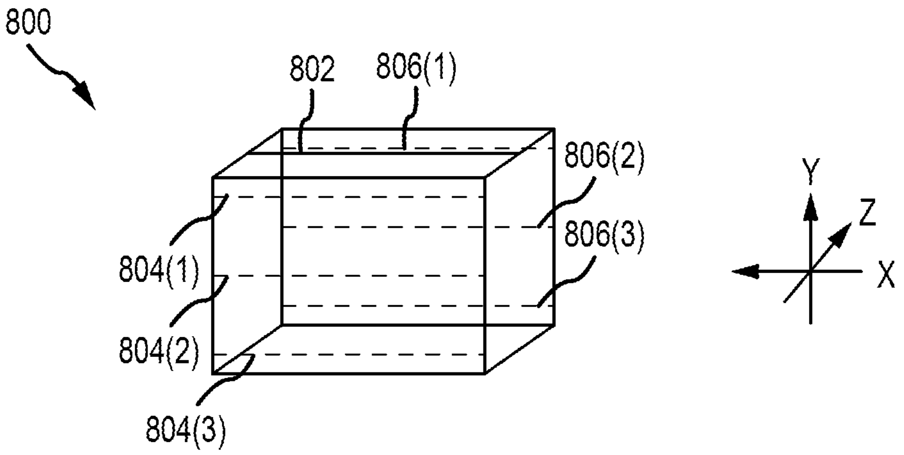
FIG.8A (PRIOR ART)
FIG. 8A illustrates a box after undergoing perforating operations performed by the prior art box opening system of FIG. 2.

As shown in FIG. 8A, a box 800 perforated by use of a prior art system for opening boxes 200 (FIG. 2) includes a top perforation 802, one or more, if any, proximal-side perforations 804(1)-(3), and one or more, distal-side perforations 806(1)-(3).

Figure 8B:
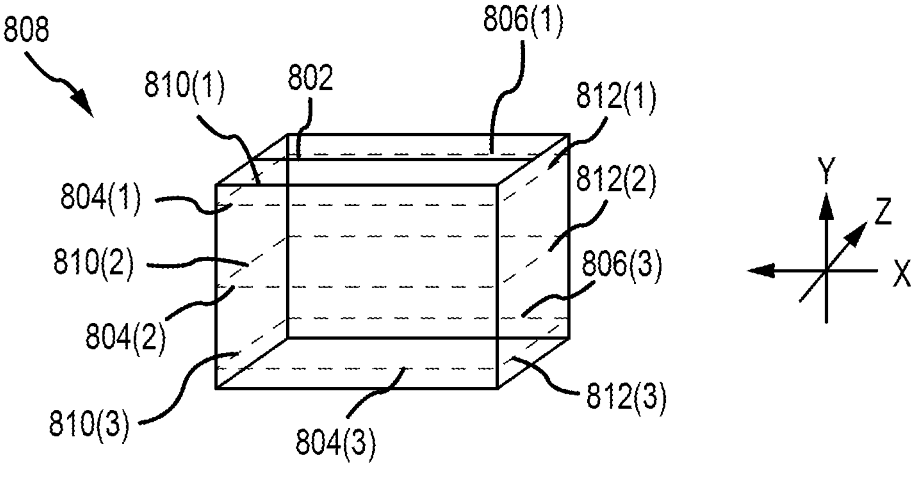
FIG. 8B illustrates a box after undergoing perforating operations performed by a new automated box opening system configured as per the system of FIG. 6 and in accordance with at least one embodiment of the present disclosure.

In contrast and as shown in FIG. 8B, a box 808 perforated by use the new system for opening boxes 600, additionally includes one or leading edge perforations 810(1)-(3) and one or more, if any, trailing edge perforations 812(1)-(3). Accordingly, it is to be appreciated that with use of an embodiment of the new system for opening boxes 600, later arising operations may facilitate more efficient removal of box components that would otherwise be encasing a given article of commerce with the application of minimal force, such as a blowing force, a sweeping force, or otherwise and without requiring further human, manual involvement.

Figure 9:
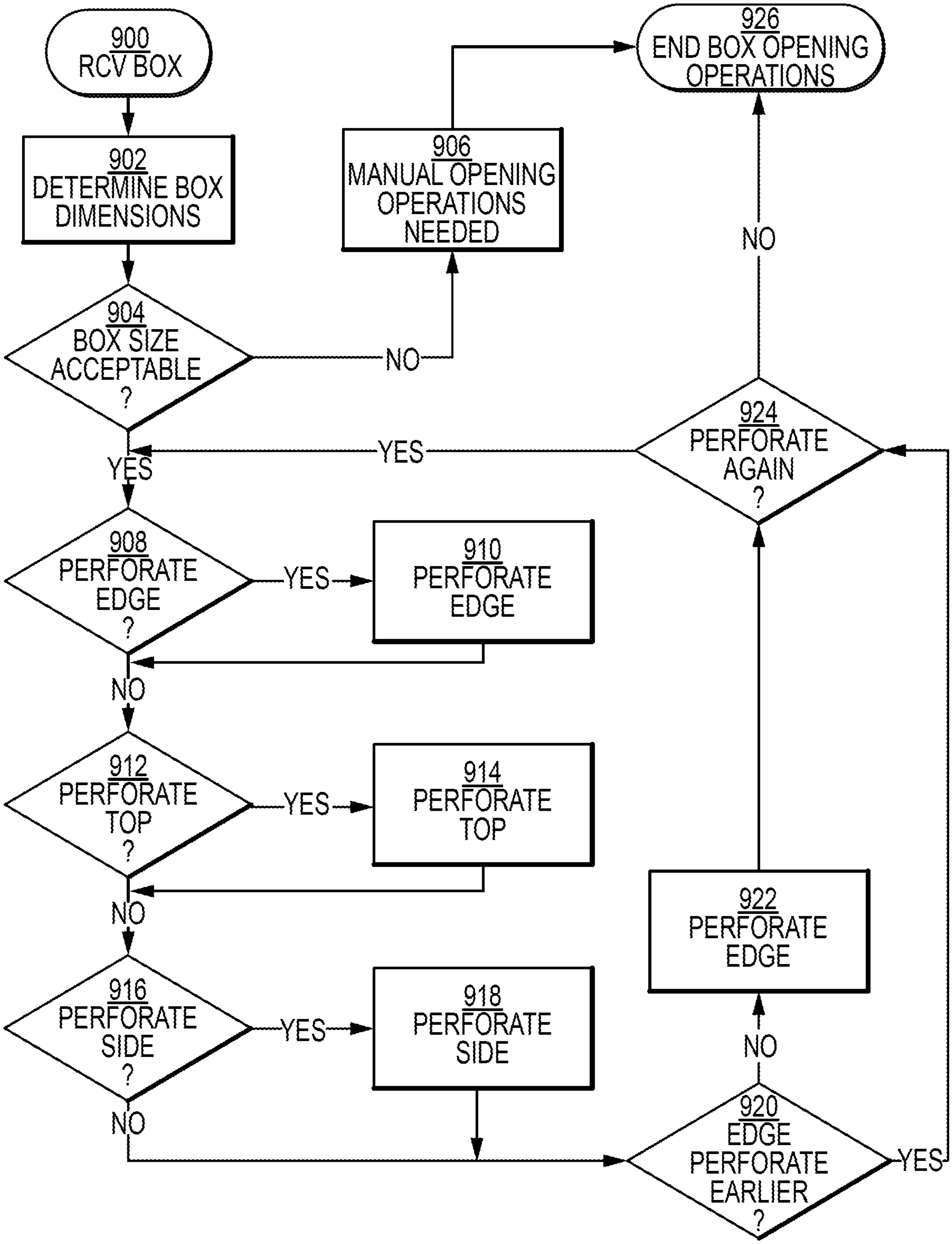
FIG. 9 is a flowchart illustrating a process for opening a box using a new box opening system configured in accordance with at least one embodiment of the present disclosure.
Figure 10:
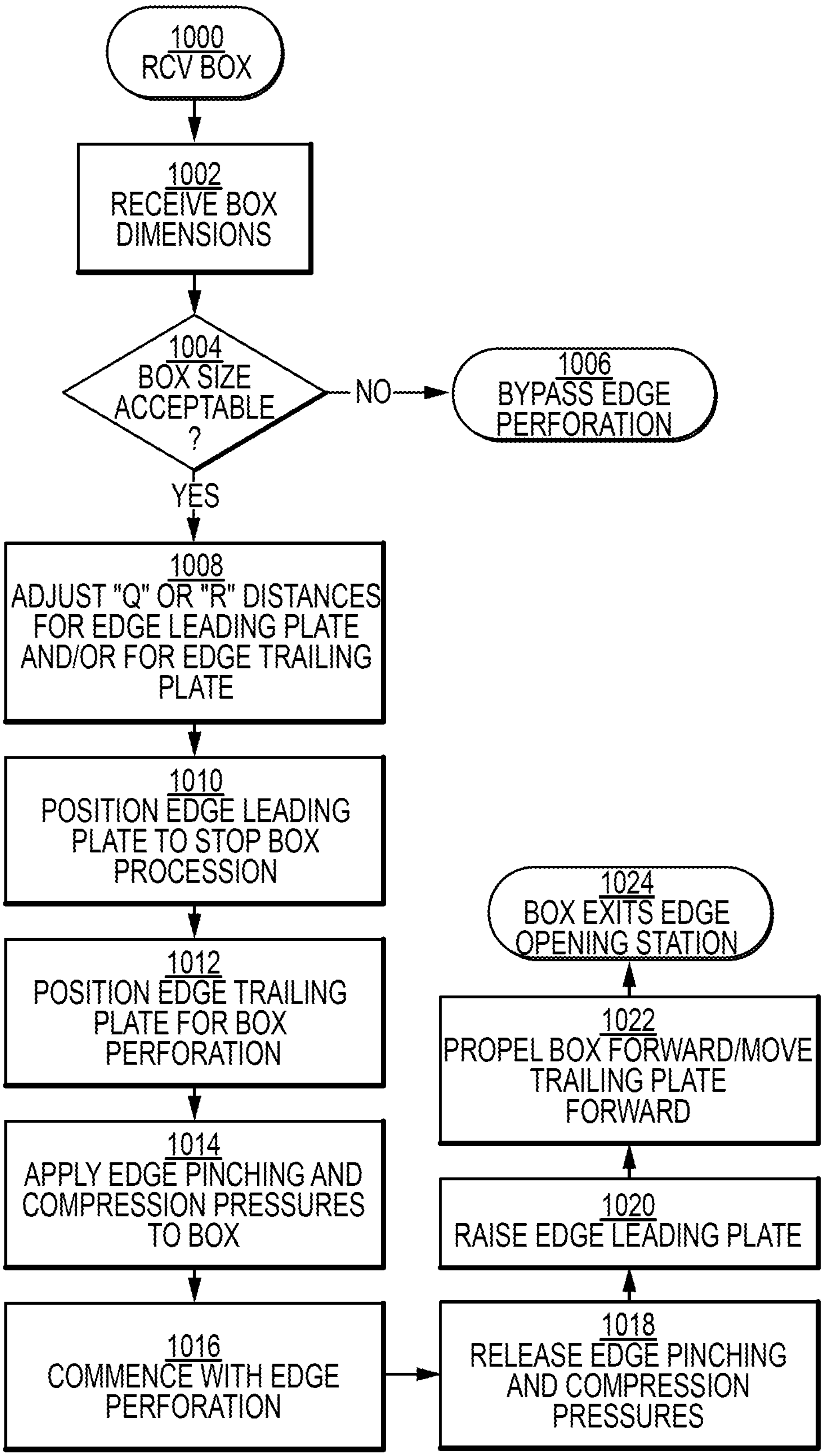
FIG. 10 is a flowchart illustrating a process for perforating one or more edges of a box and in accordance with at least one embodiment of the present disclosure.

As shown in FIGS. 9 and 10, one or more operations may be used in accordance with an embodiment of the present disclosure to facilitate opening of boxes. Such operations are identified in a numerical sequence for purposes of clarity and identification only and is not used herein to infer that a given operation need occur before, after, in conjunction with, separately, or otherwise of any other operation. Further, It is to be appreciated that the operations described below and depicted in FIGS. 9 and 10 are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

As shown in FIG. 9, and per Operation 900, a process for opening a box begins when a box is received by a facility and positioned on a conveyor assembly or the like for opening.

Per Operation 902, the process may include determining one or more dimensions of the box. Such dimensions may be determined using a scanning station, as described above, manually, or otherwise. For at least one embodiment, each of a box's dimension in the X-Y-Z coordinate system discussed above may be determined. For other embodiments, a given box for use by a system configured in accordance with the present disclosure may be limited to boxes falling within pre-defined or otherwise definable limits, such as a box having a width, length, and height within a set of given ranges.

Per Operation 904, the process may include determining whether the box is within one more length, width, and height limitations. If "NO", then per Operation 906, the process may end, and the box may be designated for opening using a manual or other opening process.

Returning to Operation 904, if "YES", then per Operation 908, the process may proceed with determining whether a first of one or more box perforation operations is to occur. For example, whether an edge perforation operation is to occur. As discussed above, the various embodiments of the present disclosure provide for a new edge perforation operation, but as discussed above, such edge perforation may occur before, between, in lieu of, in addition to, in replacement of, or otherwise and with respect to one or more, if any, top perforation operations and one or more, if any, side perforation operations.

If "YES" and an edge perforation is to then occur, per Operation 910, edge perforation operations occur. One embodiment of such edge perforation operations are discussed below with reference to FIG. 10.

Returning to Operation 908, if "NO," then per Operation 912, the process may proceed with determining whether a top perforation operation is to then occur. As discussed above, the sequence of perforation operations, namely, edge, top, and side may proceed in any order, number of times, and otherwise. The process of FIG. 9 seeks to accommodate such sequences of operations accordingly. It is to be appreciated that various elements of the system 600 may be configured to move a box forward or backwards, along the X axis direction, in order to facilitate repeat, or particular sequences of box opening operations.

Returning to Operation 912, if "YES," then per Operation 914, the process may include perforating a top portion of the box. If "NO," then per Operation 916, the process may proceed with determining whether a side perforation operation is to then occur.

As per Operation 914, if "YES," then per Operation 918, the process may include perforating a side portion of the box. If "NO," then per Operation 920, the process may include determining whether the edge portion was perforated earlier in the process flow.

As per Operation 920, if "NO," then per Operation 922, the process may include perforating the edge portion of the box. As discussed above, edge perforation of a box may occur, as so determined, needed, desired, or otherwise, during of any embodiment of the present disclosure. The process then may include proceeding to Operation 924 and determining whether additional perforations of a box are to be performed. If "YES," then one or more of operations 910, 914 and 918 may be performed.

Referring again to Operation 922, if "YES," then the process may include Operation 924.

Once all perforation operations have been completed, the process ends at Operation 926.

As shown in FIG. 10 a process for perforating one or more edges of a box and in accordance with at least one embodiment of the present disclosure begins with an edge opening station receiving the box, as per Operation 1000.

Per Operation 1002, dimensions for the box are received by the edge opening station. Such dimensions may be provided by a scanning station, based upon preset dimensions, input by an operator, or otherwise.

Per Operation 1004, the process may include determining whether the dimensions for the given box are acceptable for use with the edge opening station. If "NO," then per Operation 1006, edge perforation is bypassed and other box opening operations may commence. If "YES," the process proceeds to Operation 1008.

Per Operation 1008, the process may include adjusting one or more distances used in positioning the edge perforating wheel(s), such as one or more of the Q+C, Q alone, R, and/or S distances.

Per Operation 1010, the process may include positioning the edge leading plate 708 into a position adapted to stop a procession of the box through the edge opening station 602. When an edge stop plate is provided, for at least one embodiment, Operation 1010 may be accomplished with use of the edge stop plate.

Per Operation 1012, the process may include position the edge trailing plate 710 into a position adapted for box edge perforation. It is to be appreciated that such position of the edge trailing plate may include adjustments in one or more of the Q and/or R distances.

Per Operation 1014, the process may include applying edge pinching pressures to edge portions of the box, and/or edge compression pressures to the top of the box, with the opposing force for the edge compression pressures being provided by the conveyor assembly 202.

Per Operation 1016, the process may include commencing with edge perforation by movement of the edge perforating wheel(s) 716 along the Z axis for the distance S. It is to be appreciated that such perforating may occur with one or multiple passes of an edge perforating wheel(s) 716 across an edge portion of the box. Such edge portions may include either, if not both, the leading edge portion, and the trailing edge portion for the box. Further, the edge perforation operations may occur at varying distances R, with the edge perforating wheels being raised or lowered relative to the top portion of the box and as desired for a given implementation of an embodiment of the present disclosure.

Per Operations 1018 to 1024, the process may include operations directed to releasing the box from the edge opening station so that other operations, opening or otherwise, may then occur.

More specifically, per Operation 1018, the process may include releasing of edge pinching and/or top compression pressures upon the box by the edge opening station members.

Per Operation 1020, the process may include raising the edge leading plate 708.

Per Operation 1022, the process may include propelling the box forward by, for example, shortening the distance Q and moving the edge trailing plate 710 forward along the conveyor assembly 202. For at least one embodiment, a short impulse movement of the edge trailing plate 710 may be sufficient to initiate forward movement of the box along the conveyor assembly 202, for other embodiments, a continuous movement of the edge trailing plate 710 forward may be performed until a leading edge of the box comes into contact with other drive assemblies provided by other opening stations, other box propulsion means, or otherwise.

Per Operation 1024, the process ends when the box exits the edge opening station.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit mechanical and/or electrical connections between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A system, facilitating automated opening of a box, comprising:

a scanning station which measures one or more of a length, height, and width of a box;

wherein the box has box dimensions including a box length L, a box height H, and a box width W;

wherein the box is formed in substantially one of a square or rectangular configuration by:

a top portion;

a bottom portion;

wherein the top portion and the bottom portion have the box length L by the box width W dimensions;

two side portions having the box length L by the box height H dimensions; and two edge portions, including a leading edge portion and a trailing edge portion;

wherein the two edge portions have the box height H by the box width W dimensions;

an edge opening station that performs perforation operations on at least one of the two edge portions;

wherein the edge opening station further comprises:

an edge leading plate;

an edge trailing plate;

an edge perforating wheel; and a first edge adjustment mechanism coupled to the edge leading plate and the edge trailing plate;

wherein the first edge adjustment mechanism mechanically adjusts a first distance Q between the edge leading plate and the edge trailing plate;

wherein the first edge adjustment mechanism includes a mechanical adjustment device comprising one of a belt drive, a screw drive, a hydraulic piston, or a gear drive; and a conveyor assembly, forming a conveyor plane, contacting the bottom portion of the box and facilitating movement of the box forward across the conveyor plane and through the scanning station and the edge opening station; and wherein the system performs operations during operational phases including an edge positioning phase, an edge perforation phase, an edge release phase, and an edge propel phase;

wherein during the edge positioning phase and the edge release phase, the first edge adjustment mechanism sets the first distance Q by including a minimum longitudinal clearance C such that Q=L+C; and wherein during the edge perforation phase, the first edge adjustment mechanism sets the first distance Q<=L.

2. The system of claim 1, wherein the minimum longitudinal clearance C is at least two millimeters (2 mm).

3. The system of claim 1, wherein the minimum longitudinal clearance C is predetermined based on the box dimensions.

4. The system of claim 1, further comprising:

wherein, during at least the edge perforation phase, an edge pinching pressure is applied, by the first edge adjustment mechanism, through the edge leading plate and the edge trailing plate, onto the box.

5. The system of claim 4, wherein, during the edge perforation phase, the edge pinching pressure compresses the box.

6. The system of claim 5, wherein the edge pinching pressure is proportional to a difference between the first distance Q and the box length L.

7. The system of claim 1, wherein, during the edge propel phase, the first edge adjustment mechanism moves the edge trailing plate forward, along the conveyor assembly, and thereby propel the box through the edge opening station.

8. The system of claim 1, further comprising:

a second edge adjustment mechanism, coupled to the first edge adjustment mechanism, vertically adjusts, relative to the conveyor plane, a second height R of at least one of the edge leading plate and the edge trailing plate; and wherein the second edge adjustment mechanism includes at least one of a mechanical adjustment device comprising one of a belt drive, a screw drive, a hydraulic piston, and a gear drive.

9. A system, facilitating automated opening of a box, comprising:

a scanning station which measures one or more of a length, height, and width of a box;

wherein the box has box dimensions including a box length L, a box height H, and a box width W;

wherein the box is formed in substantially one of a square or rectangular configuration by:

a top portion;

a bottom portion;

wherein the top portion and the bottom portion have the box length L by the box width W dimensions;

two side portions having the box length L by the box height H dimensions; and two edge portions, including a leading edge portion and a trailing edge portion;

wherein the two edge portions have the box height H by the box width W dimensions;

an edge opening station that performs perforation operations on at least one of the two edge portions;

wherein the edge opening station further comprises:

an edge leading plate;

an edge trailing plate;

an edge perforating wheel; and a first edge adjustment mechanism coupled to the edge leading plate and the edge trailing plate;

wherein the first edge adjustment mechanism mechanically adjusts a first distance Q between the edge leading plate and the edge trailing plate; and wherein the first edge adjustment mechanism includes a mechanical adjustment device comprising at least one of a belt drive, a screw drive, a hydraulic piston, or a gear drive; and a conveyor assembly, forming a conveyor plane, contacting the bottom portion of the box and facilitating movement of the box forward across the conveyor plane and through the scanning station and the edge opening station; and wherein the system performs operations during operational phases including an edge positioning phase, an edge perforation phase, an edge release phase, and an edge propel phase;

a second edge adjustment mechanism, coupled to the first edge adjustment mechanism, vertically adjusts, relative to the conveyor plane, a second height R of at least one of the edge leading plate and the edge trailing plate; and wherein the second edge adjustment mechanism includes at least one of a mechanical adjustment device comprising one of a belt drive, a screw drive, a hydraulic piston, and a gear drive;

wherein, during the edge positioning phase, the second height R of the edge trailing plate is adjusted, by the second edge adjustment mechanism, by a height clearance D above the box height H;

wherein, during the edge perforation phase, the second height R of the edge leading plate and the edge trailing plate are adjusted, by the second edge adjustment mechanism, relative to the box height H and an edge compression pressure is applied downward onto the box by the edge leading plate and by the edge trailing plate; and wherein, during the edge release phase, the second edge adjustment mechanism:

releases the edge compression pressure, and raises the edge leading plate until R>H.

10. The system of claim 9, wherein, during the edge release phase, the second edge adjustment mechanism raises the edge leading plate by the box height H plus a second vertical clearance margin E and R=H+E.

11. The system of claim 10, wherein, during the edge release phase, the second edge adjustment mechanism raises the edge trailing plate and R=H+E.

12. The system of claim 11, further comprising:

wherein, during at least the edge perforation phase, an edge compression pressure is applied, by the second edge adjustment mechanism, through the edge leading plate and the edge trailing plate, onto the box.

13. The system of claim 12, wherein the edge leading plate has a first inverted “L” shaped configuration including a vertical member and a first horizontal member extending towards the edge trailing plate;

wherein the edge trailing plate has an opposing inverted “L” shaped configuration including a second vertical member and a second horizontal member extending towards the edge leading plate; and wherein the edge compression pressure is applied on the box by at least one of the first horizontal member and the second horizontal member.

14. A system, facilitating automated opening of a box, comprising:

a scanning station which measures one or more of a length, height, and width of a box;

wherein the box has box dimensions including a box length L, a box height H, and a box width W;

wherein the box is formed in substantially one of a square or rectangular configuration by:

a top portion;

a bottom portion;

wherein the top portion and the bottom portion have the box length L by the box width W dimensions;

two side portions having the box length L by the box height H dimensions; and two edge portions, including a leading edge portion and a trailing edge portion;

wherein the two edge portions have the box height H by the box width W dimensions;

an edge opening station that performs perforation operations on at least one of the two edge portions;

wherein the edge opening station further comprises:

an edge leading plate;

an edge trailing plate;

an edge perforating wheel; and a first edge adjustment mechanism coupled to the edge leading plate and the edge trailing plate;

wherein the first edge adjustment mechanism mechanically adjusts a first distance Q between the edge leading plate and the edge trailing plate;

wherein the first edge adjustment mechanism includes a mechanical adjustment device comprising at least one of a belt drive, a screw drive, a hydraulic piston, or a gear drive; and a conveyor assembly, forming a conveyor plane, contacting the bottom portion of the box and facilitating movement of the box forward across the conveyor plane and through the scanning station and the edge opening station; and wherein the system performs operations during operational phases including an edge positioning phase, an edge perforation phase, an edge release phase, and an edge propel phase;

an edge guide slot extending horizontally a third distance through at least one of the edge leading plate and the edge trailing plate; and a third edge adjustment mechanism, coupled to the edge perforating wheel, moving the edge perforating wheel within the edge guide slot during the edge perforation phase; and wherein the third edge adjustment mechanism includes at least one of a mechanical adjustment device comprising one of a belt drive, a screw drive, a hydraulic piston, and a gear drive.

15. The system of claim 14, further comprising:

wherein, during the edge perforation phase, a given edge perforation pressure is applied, by the edge perforation wheel onto the box.

16. The system of claim 15, wherein the third edge adjustment mechanism facilitates positioning of the edge perforation wheel relative to one of the two edge portions.

17. A system, facilitating automated opening of a box, comprising:

a scanning station configured to measure one or more of a length, height, and width of a box;

wherein the box has a box length L, a box height H, and a box width W;

wherein the box is formed in substantially one of a square or rectangular configuration by:

a top portion;

wherein the top portion and the bottom portion have the box length L by the box width W dimensions; two side portions having the box length L by the box height H dimensions; and two edge portions having the box height H by the box width W dimensions; a bottom portion;

an edge opening station configured to perform perforation operations on at least one of the two edge portions;

wherein the edge opening station further comprises:

an edge leading plate;

an edge trailing plate; and wherein at least one of the edge leading plate and edge trailing plate further comprise an edge guide slot;

a first edge adjustment mechanism coupled to the edge leading plate and the edge trailing plate;

wherein the first edge adjustment mechanism is configured to mechanically adjust a first distance Q between the edge leading plate and the edge trailing plate; and a conveyor assembly configured to contact the bottom portion of the box and facilitate movement of the box through the scanning station and the edge opening station;

an edge perforating wheel;

a second edge adjustment mechanism, coupled to the first edge adjustment mechanism, configured to vertically adjust, relative to a conveyor plane, a second height R of at least one of the edge leading plate and the edge trailing plate; and a third edge adjustment mechanism, coupled to the edge perforating wheel, configured, during an edge perforation phase, to move the edge perforating wheel within the edge guide slot in at least one of the edge leading plate and the edge trailing plate; and wherein the system is configured to perform operations during an edge positioning phase, the edge perforation phase, an edge release phase, and an edge propel phase.

18. The system of claim 17, wherein during the edge positioning phase, the first edge adjustment mechanism is configured to adjust the first distance Q between the edge leading plate and the edge trailing plate based on the box length L and a longitudinal clearance margin C; and the second edge adjustment mechanism is configured to adjust a current height of the edge leading plate by a first vertical clearance margin D and R+D>H; and wherein during the edge perforating phase, Q<=L and R~H.

19. A device comprising:

a leading plate configured to first secure a box during a perforation operation;

wherein the box has a box length L, a box height H, and a box width W;

a trailing plate configured to second secure the box during the perforation operation;

wherein the trailing plate further comprises a guide slot;

a perforating wheel configured to perforate the box during the perforation operation;

a first adjustment mechanism, coupled to and configured to mechanically adjust a first distance Q between the leading plate and the trailing plate;

a second adjustment mechanism, coupled to the leading plate and the trailing plate, configured to mechanically adjust a second height R of at least one of the leading plate and the trailing plate; and a third adjustment mechanism configured to mechanically move the perforating wheel along the guide slot along a portion of the width W of the box.

20. The device of claim 19, wherein the device is configured for use in a box opening system configured to perform operations during an edge perforation phase;

wherein the first adjustment mechanism is configured to apply a pinching pressure on the box during the edge perforating phase;

wherein the second adjustment mechanism is configured to apply an edge compression pressure on the box during the edge perforating phase; and wherein the third adjustment mechanism is configured to apply an edge perforation pressure on the box during the edge perforating phase.

* * * * *